United States Patent
Purkayastha et al.

(10) Patent No.: US 11,985,557 B2
(45) Date of Patent: May 14, 2024

(54) SIGNALING FOR CONDITIONAL PRIMARY SECONDARY CELL ADDITION/CHANGE CONFIGURATION

(71) Applicant: QUALCOMM Incorporated, San Diego, CA (US)

(72) Inventors: Punyaslok Purkayastha, San Diego, CA (US); Ravi Agarwal, San Diego, CA (US); Ozcan Ozturk, San Diego, CA (US); Gavin Bernard Horn, La Jolla, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/483,644

(22) Filed: Sep. 23, 2021

(65) Prior Publication Data

US 2022/0116840 A1    Apr. 14, 2022

Related U.S. Application Data

(60) Provisional application No. 63/090,689, filed on Oct. 12, 2020.

(51) Int. Cl.
*H04W 36/00*    (2009.01)
*H04L 1/1867*    (2023.01)
(Continued)

(52) U.S. Cl.
CPC ..... *H04W 36/00837* (2018.08); *H04L 1/1896* (2013.01); *H04W 36/08* (2013.01);
(Continued)

(58) Field of Classification Search
CPC ......... H04W 36/0005; H04W 36/0083; H04W 36/00837; H04W 36/00; H04W 36/08;
(Continued)

(56) References Cited

U.S. PATENT DOCUMENTS

| 11,463,924 B2 * | 10/2022 | Wu | H04W 36/24 |
| 2021/0099926 A1 * | 4/2021 | Chen | H04W 36/08 |

(Continued)

FOREIGN PATENT DOCUMENTS

| FI | 3975656 | * | 3/2022 | ............ H04W 76/10 |
| SE | WO2022010398 | * | 1/2022 | ............ H04W 36/00 |
| WO | 2022064716 A1 | | 3/2022 | |

OTHER PUBLICATIONS

Ericsson: "Conditional Reconfigurations", 3GPP Draft, R2-2007599, 3GPP TSG-RAN WG2 #111, 3rd Generation Partnership Project (3GPP), Mobile Competence Centre, 650, Route Des Lucioles, F-06921 Sophia-Antipolis Cedex, France, vol. Ran WG2, No Electronic meeting, Aug. 17, 2020-Aug. 28, 2020, Aug. 6, 2020 (Aug. 6, 2020), XP051911073, 10 Pages, Retrieved from the Internet: URL:https://ftp.3gpp.org/tsg_ran/WG2_RL2/TSGR2_111-e/Docs/R2-2007599.zip R2-2007599-Conditional reconfigurations.docx retrieved on Aug. 6, 2020] p. 1-p. 10.

(Continued)

*Primary Examiner* — Warner Wong
(74) *Attorney, Agent, or Firm* — Loza & Loza LLP

(57) ABSTRACT

Aspects relate to wireless communication where a master node (MN) or a secondary node (SN) may initiate a conditional addition of a primary secondary cell (PSCell) or a conditional change from one PSCell to another PSCell. Each candidate target PSCell may provide information to be used by the MN to generate a conditional PSCell addition (CPA) configuration or a conditional PSCell change (CPC) configuration that is sent to a user equipment (UE). This information may indicate an execution condition for each candidate target PSCell and/or radio bearers that each candidate target PSCell supports or does not support. An MN may modify a master cell group (MCG) configuration for a PSCell based on information received from a target SN with an secondary cell group (SCG) configuration for the PSCell.

(Continued)

The MN may transmit a CPA or CPC configuration including the modified MCG configuration and the SCG configuration to the UE.

28 Claims, 19 Drawing Sheets

(51) Int. Cl.
*H04W 36/08* (2009.01)
*H04W 36/32* (2009.01)
*H04W 36/34* (2009.01)
*H04W 84/06* (2009.01)

(52) U.S. Cl.
CPC ............ *H04W 36/32* (2013.01); *H04W 36/34* (2013.01); *H04W 84/06* (2013.01)

(58) Field of Classification Search
CPC ..... H04W 84/02; H04W 84/04; H04W 84/06; H04W 36/24; H04W 36/32; H04W 36/34; H04W 36/38; H04W 76/15; H04L 1/1867; H04L 1/1896; H04L 41/08; H04L 41/0803; H04L 41/0823
See application file for complete search history.

(56) References Cited

U.S. PATENT DOCUMENTS

| | | | | |
|---|---|---|---|---|
| 2021/0352543 | A1* | 11/2021 | Purkayastha | H04W 76/11 |
| 2021/0400760 | A1* | 12/2021 | Yang | H04W 36/305 |
| 2022/0232448 | A1* | 7/2022 | Ebrahim Rezagah | |
| | | | | H04W 36/36 |
| 2023/0094897 | A1* | 3/2023 | Wang | H04W 36/00837 |
| | | | | 370/331 |
| 2023/0109703 | A1* | 4/2023 | Sun | H04W 24/10 |
| | | | | 370/329 |
| 2023/0217329 | A1* | 7/2023 | Wallentin | H04W 36/0058 |
| | | | | 370/331 |
| 2023/0232494 | A1* | 7/2023 | Wang | H04W 76/34 |
| | | | | 370/329 |
| 2023/0239751 | A1* | 7/2023 | Kim | H04W 76/20 |
| | | | | 370/331 |
| 2023/0262600 | A1* | 8/2023 | Wallentin | H04W 36/0088 |
| | | | | 370/311 |
| 2023/0284105 | A1* | 9/2023 | Stanczak | H04W 36/0064 |
| | | | | 370/331 |
| 2023/0363027 | A1* | 11/2023 | Da Silva | H04W 76/20 |
| 2023/0370936 | A1* | 11/2023 | Eklöf | H04W 36/0069 |
| 2023/0379788 | A1* | 11/2023 | Eklöf | H04W 76/30 |
| 2023/0379789 | A1* | 11/2023 | Da Silva | H04W 36/0069 |

OTHER PUBLICATIONS

Intel Corporation: "Rel-17 Conditional PSCell Addition", 3GPP Draft, R2-2007237, 3GPP TSG-RAN WG2 Meeting #111-e, 3rd Generation Partnership Project (3GPP), Mobile Competence Centre, 650, Route Des Lucioles, F-06921 Sophia-Antipolis Cedex, France, vol. RAN WG2, No. Electronic Meeting, Aug. 17, 2020-Aug. 28, 2020, Aug. 7, 2020 (Aug. 7, 2020), XP051912038, 9 Pages, Retrieved from the Internet: URL:https://ftp.3gpp.org/tsg_ran/WG2_RL2/TSGR2_111-e/Docs/R2-2007237.zip, R2-2007237_R17_CPAC_disc_vS.doc [retrieved on Aug. 7, 2020] p. 1-p. 9.
International Search Report and Written Opinion—PCT/US2021/052037—ISA/EPO—dated Mar. 29, 2022.
CATT: "Introduction of Conditional PSCell Change for Intra-SN Without MN Involvement", 3GPP Draft, 3GPP TSG-RAN2 Meeting #110 electronic, RP-201177 (R2-2006379), 3rd Generation Partnership Project (Jun. 1, 2020-Jun. 12, 2020, Jun. 25, 2020 (Jun. 25, 2020), XP051906109, 21 Pages, Retrieved from the Internet: URL: https://ftp.3gpp.org/3guInternal/3GPP_Ultimate_CRPacks/RP-201177.zip.37340_CR0210_ (Rel-16)_ R2-2006379, 37340 CR on NR CPC_final. Docx. [Retrieved on Jun. 25, 2020] p. 1-p. 19.
Partial International Search Report—PCT/US2021/052037—ISA/EPO—dated Dec. 25 202.
Qualcomm Incorporated : "Conditional PSCell Addition/Change", 3GPP Draft, 3GPP TSG-RAN WG2 Meeting #111-e, R2-2007749, 3rd Generation Partnership Project (3GPP), Mobile Competence Centre, 650, Route Des Lucioles, F-06921 Sophia-Antipolis Cedex, France, vol. RAN WG2, No. E-Meeting, Aug. 18, 2020-Aug. 28, 2020, Aug. 7, 2020 (Aug. 8, 2020), XP051912376, 8 Pages, Retrieved from the Internet: URL: https://ftp.3gpp.org/tsg_ran/WG2_RL2/TSGR2_111-e/Docs/R2-2007749.zip. R2-2007749.docx [Retrieved on Aug. 7, 2020] p. 1-p. 8.
Qualcomm Incorporated : "CPA and MN Initiated Intei-SN CPC Procedures: Preparation and Execution Phases", 3GPP Draft, 3GPP TSG-RAN WG2 Meeting #113-e, R2-2101872, 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, Jan. 15, 2021, (Jan. 15, 2021), XP051974734, 6 Pages, Retrieved from the Internet: URL: https://ftp.3gpp.org/tsg_ran/WG2_RL2/TSGR2_113-e/Docs/R2-2101872.zip. R2-2101872 .docx [Retrieved on Jan. 15, 2021]. p. 1-p. 6.
Qualcomm Incorporated: "Configuration of Conditional PSCell Addition/Change", 3GPP Draft, 3GPP TSG-RAN WG2 Meeting #112-e, R2-2010130, 3rd Generation Partnership Project (3GPP), Mobile Competence Centre, 650, Route Des Lucioles, F-06921 Sophia-Antipolis Cedex, France, vol. RAN WG2, No. E-meeting, Nov. 2, 2020-Nov. 13, 2020, Oct. 23, 2020 (Oct. 23, 2020), XP051942819, 7 Pages, Retrieved from the Internet: URL: https://ftp.3gpp.org/tsg_ran/WG2_RL2/TSGR2_112-e/Docs/R2-2010130.zip. R2-2010130.docx [Retrieved on Oct. 23, 2020] p. 1-p. 7.
Qualcomm Incorporated: "CPA and MN Initiated Inter-SN CPC Procedures: Preparation, Execution, and Data Forwarding", 3GPP Draft, 3GPP TSG-RAN WG3 Meeting #111-e, R3-210353 , 3rd Generation Partnership Project (3GPP), Mobile Competence Centre, 650, Route Des Lucioles, F-06921 Sophia-Antipolis Cedex, France, vol. Ran WG3, No. E-Meeting, Jan. 25, 2021-Feb. 5, 2021, Jan. 15, 2021 (Jan. 15, 2021), XP051975063, 7 Pages, Retrieved from the Internet : URL: https://ftp.3gpp.org/tsg_ran/WG3_lu/TSGR3_111-e/Docs/R3-210353.zip. R3- 210353 .docx (Retrieved on Jan. 15, 2021] p. 1-p. 8.
Qualcomm Incorporated: "Signaling Related to Conditional PSCell Addition/Change Configuration", 3GPP Draft, 3GPP TSG-RAN WG3 Meeting #110-e, R3-206178, 3rd Generation Partnership Project (3GPP), Mobile Competence Centre, 650, Route Des Lucioles, F-06921 Sophia-Antipolis Cedex, France, vol. RAN WG3, No. E-meeting, Nov. 2, 2020-Nov. 12, 2020, Oct. 23, 2020 (Oct. 23, 2020), XP051945751, 7 Pages, Retrieved from the Internet: URL: https://ftp.3gpp.org/tsg_ran/WG3_lu/TSGR3_110-e/Docs/R3-206178.zip. R3-206178, Conditional PSCell Addition and Change.docx. [Retrieved on Oct. 23, 2020] p. 1-p. 7.
Qualcomm Incorporated: "SN Initiated Inter-SN CPC Procedure: Preparation, Execution, and Data Forwarding", 3GPP Draft, 3GPP TSG-RAN WG3 Meeting #111-e, R3- 210354, 3rd Generation Partnership Project (3GPP), Mobile Competence Centre, 650, Route Des Lucioles, F-06921 Sophia-Antipolis Cedex, France, vol. RAN WG3, No. E-Meeting, Jan. 25, 2021-Feb. 5, 2021, Jan. 15, 2021 (Jan. 15, 2021), XP051975064, 7 Pages, Retrieved from the Internet: URL: https://ftp.3gpp.org/tsg_ran/WG3_lu/TSGR3_111-e/Docs/R3-210354.zip. R3-210354 .docx. [Retrieved on Jan. 15, 2021] p. 1-p. 7.
Qualcomm Incorporated: "SN Initiated Inter-SN CPC Procedure: Preparation and Execution Phases", 3GPP Draft, 3GPP TSG-RAN WG2 Meeting #113-e, R2-2101875, 3rd Generation Partnership Project (3GPP), Mobile Competence Centre, 650, Route Des Lucioles, F-06921 Sophia-Antipolis Cedex, France, vol. Ran WG2, No. E-meeting, Jan. 25, 2021-Feb. 5, 2021, Jan. 15, 2021 (Jan. 15,

(56) References Cited

OTHER PUBLICATIONS

2021), XP051974737, 6 Pages, Retrieved from the Inter.net: URL :https ://ftp.3gpp.org/tsg_ran/WG2_RL2/TSGR2_113-e/Docs/R2-2101875.zip. R2-2101875 .docx [retrieved on Jan. 15, 2021] p. 1-p. 6.

* cited by examiner

SIGNALING FOR CONDITIONAL PRIMARY SECONDARY CELL ADDITION/CHANGE CONFIGURATION

CROSS-REFERENCE TO RELATED APPLICATIONS

The present application for patent claims priority to and the benefit of U.S. Provisional Application No. 63/090,689, titled "SIGNALING FOR CONDITIONAL PRIMARY SECONDARY CELL ADDITION/CHANGE CONFIGURATION" filed Oct. 12, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to signaling associated with an addition and/or a change in a primary secondary cell configuration.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

Different cells may serve a UE at different times. For example, initially a UE may be served by a first set of cells. Subsequently, an additional cell may be selected to serve the UE (e.g., to provide additional resources for serving the UE). Alternatively or in addition, a cell that is serving the UE may be changed (switched out) whereby a different cell will serve the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at an apparatus is disclosed. The method may include obtaining, from a target secondary node (SN), a secondary cell group (SCG) configuration and an associated set of information for a target primary secondary cell (PSCell) identified for a user equipment, modifying a master cell group (MCG) configuration for the target PSCell based on the associated set of information, and outputting, for transmission to the user equipment, a conditional PSCell addition (CPA) configuration including the MCG configuration and the SCG configuration for the target PSCell or a conditional PSCell change (CPC) configuration including the MCG configuration and the SCG configuration for the target PSCell.

In some examples, an apparatus for wireless communication may include an interface and a processing system coupled to the interface. The processing system may be configured to obtain, from a target secondary node (SN) via the interface, a secondary cell group (SCG) configuration and an associated set of information for a target primary secondary cell (PSCell) identified for a user equipment, modify a master cell group (MCG) configuration for the target PSCell based on the associated set of information, and output, via the interface, for transmission to the user equipment, a conditional primary secondary cell (PSCell) addition (CPA) configuration including the MCG configuration and the SCG configuration for the target PSCell or a conditional PSCell change (CPC) configuration including the MCG configuration and the SCG configuration for the target PSCell.

In some examples, an apparatus for wireless communication may include means for obtaining, from a target secondary node (SN), a secondary cell group (SCG) configuration and an associated set of information for a target primary secondary cell (PSCell) identified for a user equipment, means for modifying a master cell group (MCG) configuration for the target PSCell based on the associated set of information, and means for outputting, for transmission to the user equipment, a conditional PSCell addition (CPA) configuration including the MCG configuration and the SCG configuration for the target PSCell or a conditional PSCell change (CPC) configuration including the MCG configuration and the SCG configuration for the target PSCell.

In some examples, an article of manufacture for use by an apparatus for wireless communication includes a non-transitory computer-readable medium having stored therein instructions executable by one or more processors of the apparatus to obtain, from a target secondary node (SN), a secondary cell group (SCG) configuration and an associated set of information for a target primary secondary cell (PSCell) identified for a user equipment, modify a master cell group (MCG) configuration for the target PSCell based on the associated set of information, and output, for transmission to the user equipment, a conditional primary secondary cell (PSCell) addition (CPA) configuration including the MCG configuration and the SCG configuration for the target PSCell or a conditional PSCell change (CPC) configuration including the MCG configuration and the SCG configuration for the target PSCell.

In some examples, a method for wireless communication at an apparatus is disclosed. The method may include obtaining a secondary node (SN) Addition Request Acknowledge message that includes an identifier of a target primary secondary cell (PSCell), and outputting, for transmission to a user equipment, a conditional PSCell addition (CPA) configuration generated based on the identifier.

In some examples, an apparatus for wireless communication may include an interface and a processing system coupled to the interface. The processing system may be configured to obtain, via the interface, a secondary node (SN) Addition Request Acknowledge message that includes an identifier of a target primary secondary cell (PSCell), and output, via the interface, for transmission to a user equipment, a conditional PSCell addition (CPA) configuration generated based on the identifier.

In some examples, an apparatus for wireless communication may include means for obtaining a secondary node (SN) Addition Request Acknowledge message that includes an identifier of a target primary secondary cell (PSCell), and means for outputting, for transmission to a user equipment, a conditional PSCell addition (CPA) configuration generated based on the identifier.

In some examples, an article of manufacture for use by an apparatus for wireless communication includes a non-transitory computer-readable medium having stored therein instructions executable by one or more processors of the apparatus to obtain a secondary node (SN) Addition Request Acknowledge message that includes an identifier of a target primary secondary cell (PSCell), and output, for transmission to a user equipment, a conditional PSCell addition (CPA) configuration generated based on the identifier.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
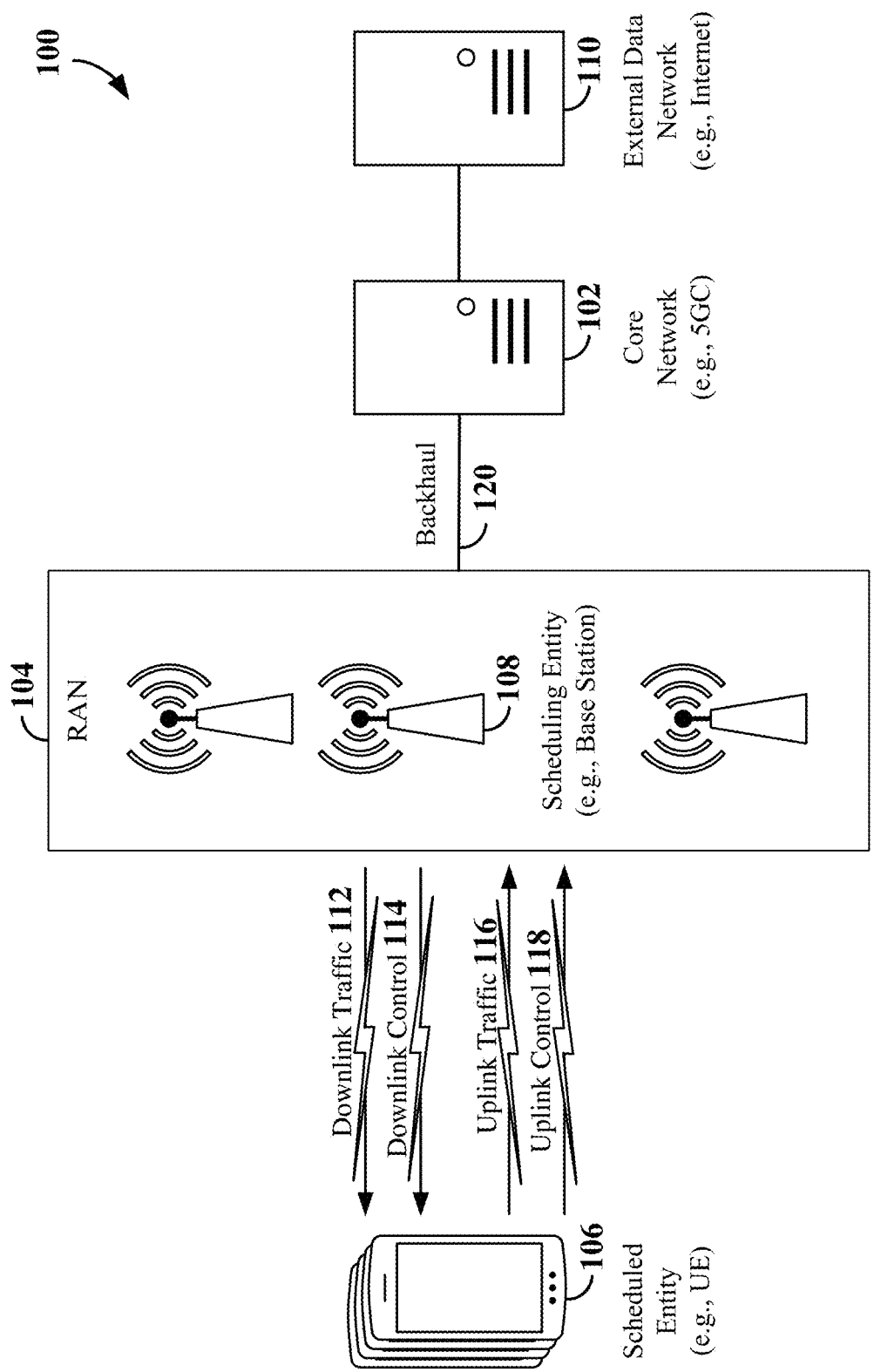
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In a wireless communication system with a master node (MN) and at least one secondary node (SN), the MN or the SN may initiate a conditional addition of a primary secondary cell (PSCell) or a conditional change from one PSCell to another PSCell. In some examples, the MN sends an SN addition request message for a conditional PSCell addition (CPA) to one or more candidate target SNs. In some examples, the MN sends an SN addition request message for a conditional PSCell change (CPC) to one or more candidate target SNs. In some examples, a source SN sends an SN change required message for a CPC to the MN and, in response, the MN sends an SN addition request message to one or more candidate target SNs. In any of these cases, each candidate target PSCell may acknowledge the addition request with information to be used for the CPA configuration or the CPC configuration. In some examples, this information may indicate an execution condition for each candidate target PSCell and/or may indicate the radio bearers that each candidate target PSCell supports.

In some examples, a source SN sends an SN modification required message for a CPC to the MN. The SN modification required message may include information to be used for the CPC configuration. Optionally, in response to the SN modification required message, the MN may send a corresponding SN modification request message to the source SN. In response, the source SN may acknowledge the modification request with information to be used for the CPC configuration. In some examples, this information may indicate an execution condition for each candidate target PSCell and/or may indicate the radio bearers that each candidate target PSCell supports.

In any of the above cases, the MN may generate a CPA configuration or a CPC configuration based on the received information and send the configuration to a user equipment (UE). This configuration may identify at least one candidate target PSCell and an execution condition for each candidate target PSCell in some examples.

Upon receiving a message from the UE indicating that an execution condition (e.g., an addition/change condition) has been met for a candidate target PSCell, the MN may transmit, to the selected candidate target PSCell or a source SN, a confirmation message associated with the conditional PSCell addition/change. After the network is reconfigured with the PSCell addition/change, the UE may perform a random access procedure on the selected PSCell to establish a connection with that PSCell.

In some examples, an MN receives a corresponding secondary cell group (SCG) configuration and associated information for each target PSCell from a target SN. For each target PSCell, the MN may modify a corresponding master cell group (MCG) configuration based on the associated information for that PSCell that was received from the target SN with the corresponding SCG configuration. The MN may then transmit a CPA or CPC configuration to a UE. Here, the CPA configuration or the CPC configuration for a given target PSCell may include the modified MCG configuration and the SCG configuration for that target PSCell.

In some examples, an MN may receive an SN Addition Request Acknowledge message that includes at least one identifier of a candidate PSCell. In this case, the MN may transmit to a UE a CPA configuration that was generated based on the at least one identifier.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or downlink traffic 112 and/or uplink traffic 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 milliseconds) for wireless transmissions, with each frame consisting of, for example, 10 subframes of 1 millisecond (ms) each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
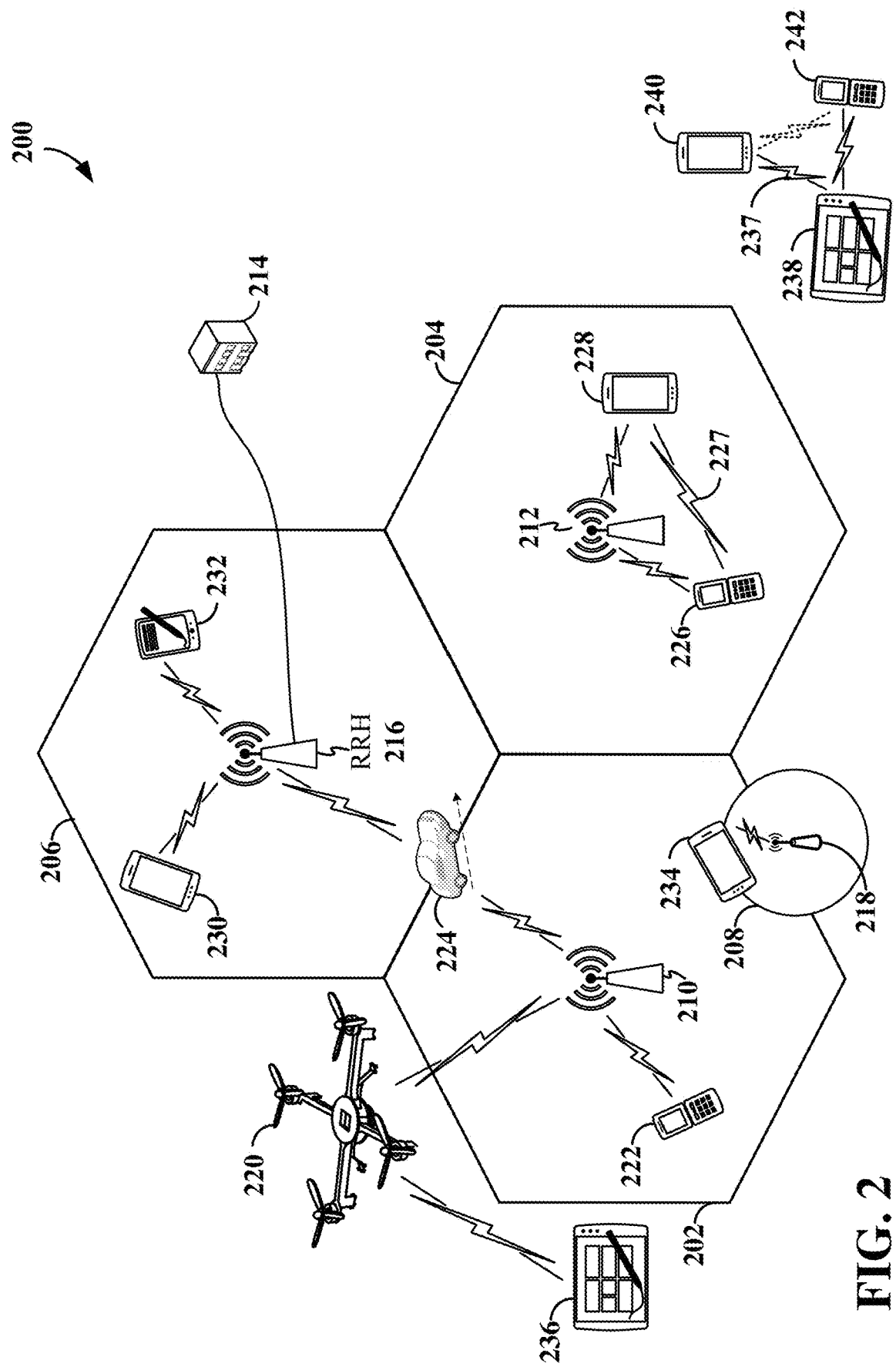
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
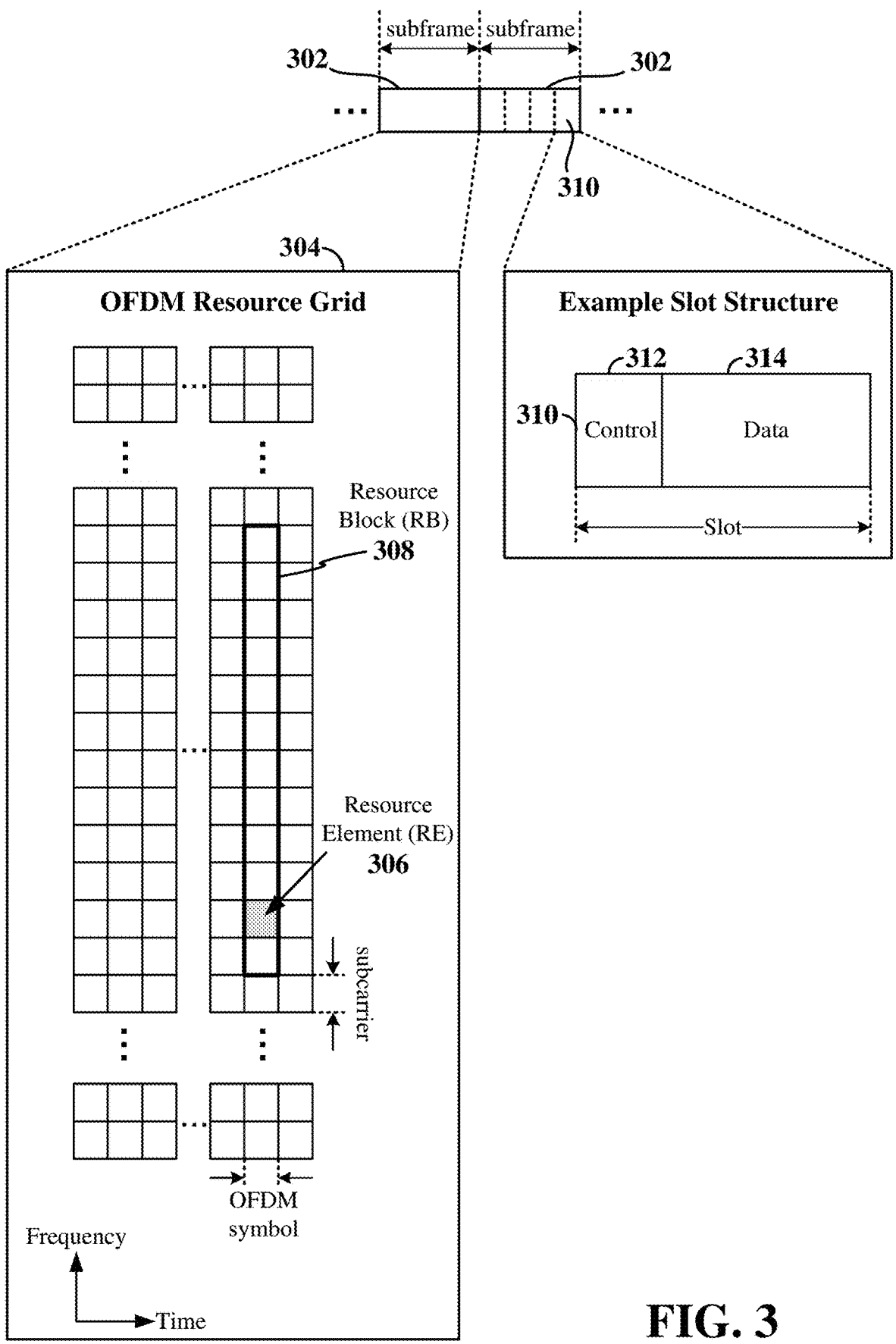
FIG. 3 is a schematic illustration of an example of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., receive (Rx) V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
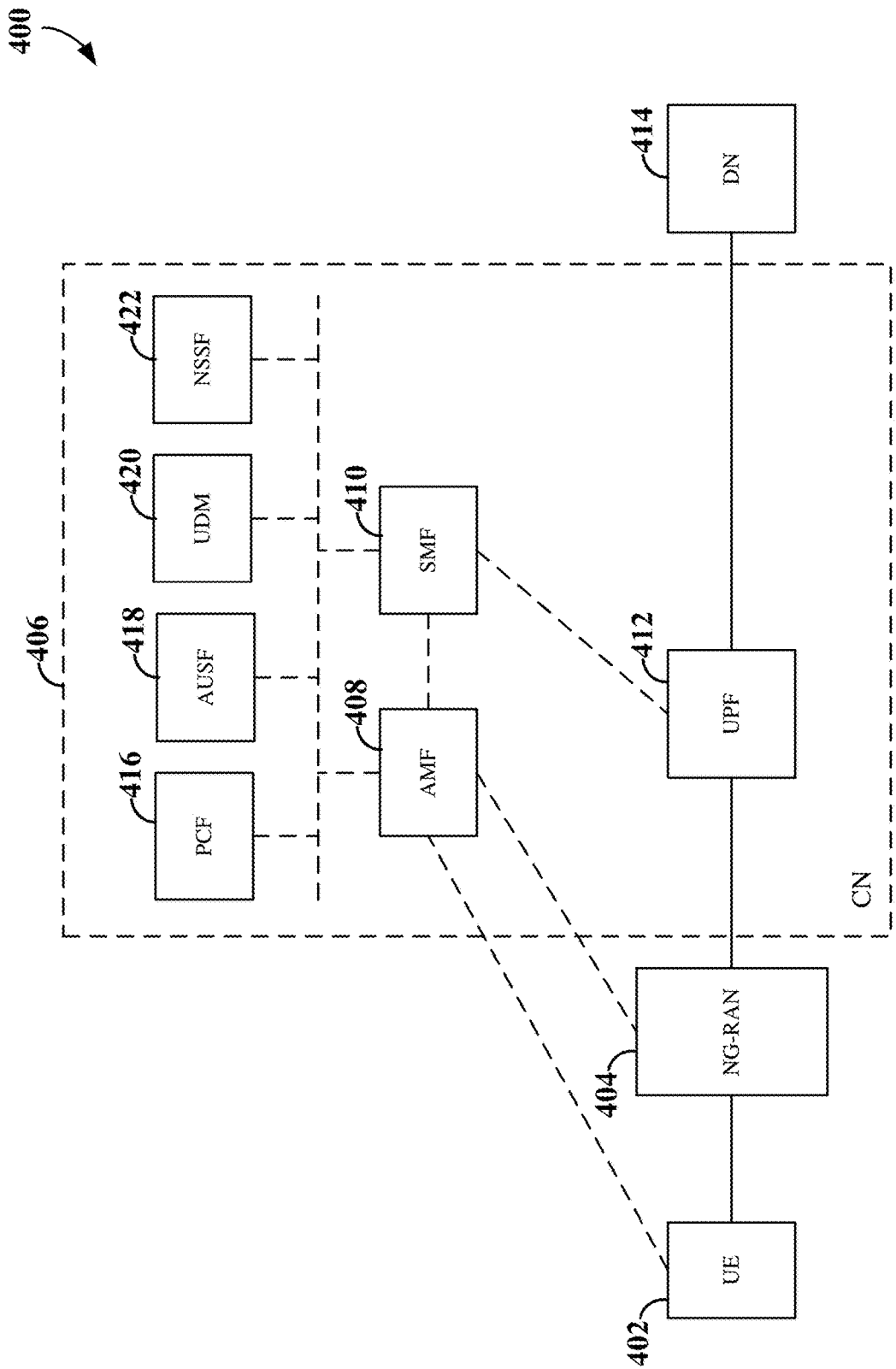
FIG. 4 is a block diagram illustrating an example of a wireless communication system according to some aspects.

FIG. 4 illustrates an example of a 5G wireless communication system (5GS) 400. In some examples, the 5GS 400 may be the same wireless communication system 100 described above and illustrated in FIG. 1. The 5GS 400 includes a user equipment (UE) 402, a next generation radio access network (NG-RAN) 404, and a 5G core network 406. The UE 402 may correspond to any of the UEs or scheduled entities shown in any of FIGS. 1, 2, and 3-12. The NG-RAN 404 may correspond to any of the BSs (e.g., gNBs, eNBs, MNs, etc.) or scheduling entities shown in any of FIGS. 1, 2, and 5-13.

The core network 406 may include, for example, an access and mobility management function (AMF) 408, a session management function (SMF) 410, and a user plane function (UPF) 412. The AMF 408 and SMF 410 employ control plane (e.g., Non Access Stratum (NAS)) signaling to perform various functions related to mobility management and session management for the UE 402. For example, the AMF 408 provides connectivity, mobility management and authentication of the UE 402, while the SMF 410 provides session management of the UE 402 (e.g., processes signaling related to protocol data unit (PDU) sessions between the UE 402 and the external data network (DN) 414). The UPF 412 provides user plane connectivity to route 5G (NR) packets to/from the UE 402 via the NG-RAN 404.

The core network 406 may further include other functions, such as a policy control function (PCF) 416, authentication server function (AUSF) 418, unified data management (UDM) 420, network slice selection function (NSSF) 422, and other functions (not illustrated, for simplicity). The PCF 416 provides policy information (e.g., rules) for control plane functions, such as network slicing, roaming, and mobility management. In addition, the PCF 416 supports 5G quality of service (QoS) policies, network slice policies, and other types of policies. The AUSF 418 performs authentication of UEs 402. The UDM 420 facilitates generation of authentication and key agreement (AKA) credentials, performs user identification and manages subscription information and UE context. In some examples, the AMF 408 includes a co-located security anchor function (SEAF) that allows for re-authentication of a UE 402 when the UE moves between different NG-RANs 404 without having to perform a complete authentication process with the AUSF 418. The NSSF 422 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish an NR SA connection to the 5G core network 406 via the NG-RAN 404, the UE 402 may transmit a registration request and PDU session establishment request to the 5G core network 406 via the NG-RAN 404. The AMF 408 and SMF 410 may process the registration request and PDU session establishment request and establish a PDU session between the UE 402 and the external DN 414 via the UPF 412. A PDU session may include one or more sessions (e.g., data sessions or data flows) and may be served by multiple UPFs 412 (only one of which is shown for convenience). Examples of data flows include, but are not limited to, Internet Protocol (IP) flows, Ethernet flows and unstructured data flows.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Figure 5:
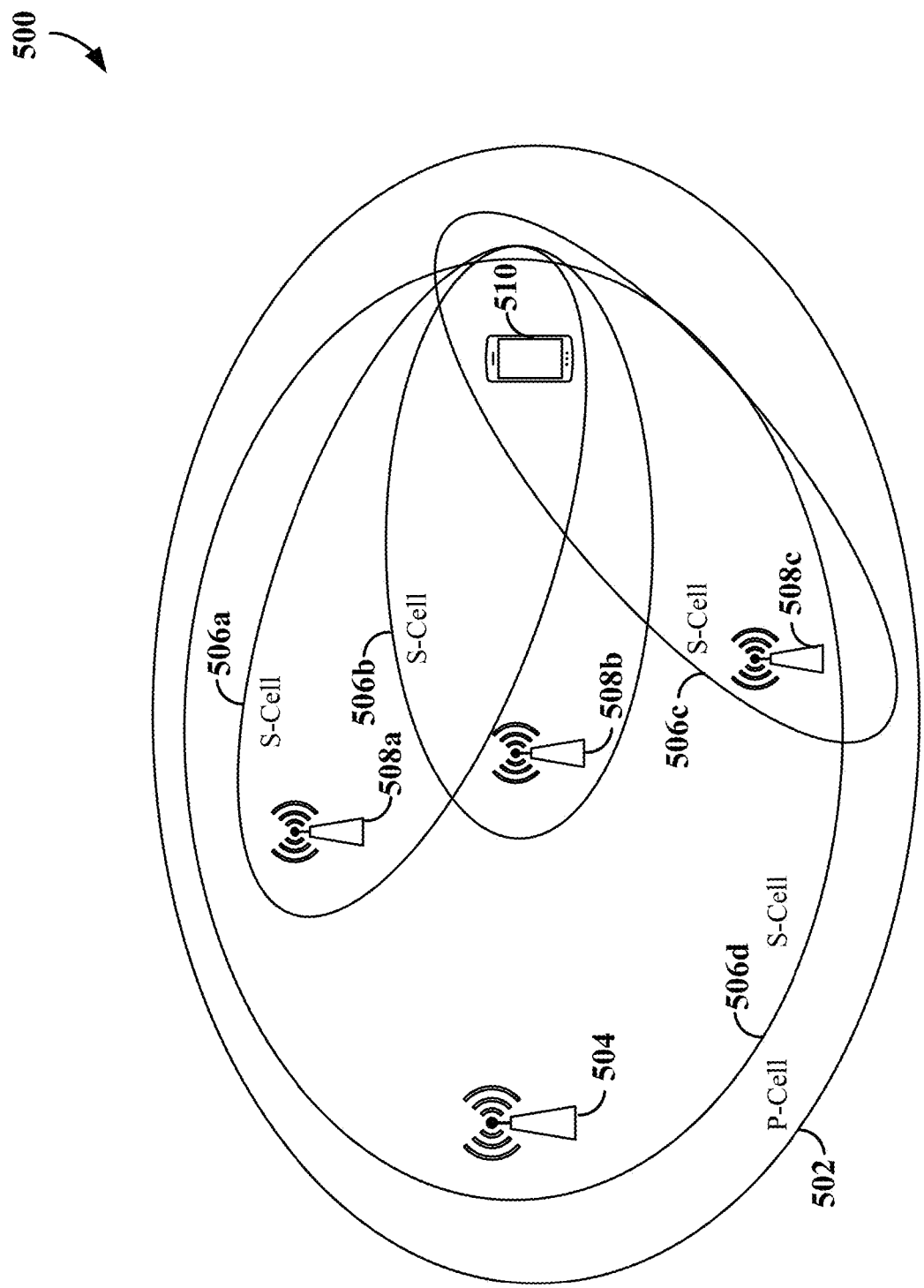
FIG. 5 is a conceptual illustration of wireless communication via multiple radio frequency (RF) carriers according to some aspects.

FIG. 5 is a conceptual illustration of a wireless communication system that shows a base station (BS) and a user equipment (UE) communicating via multiple carriers according to some aspects of the disclosure. In particular, FIG. 5 shows an example of a wireless communication system 500 that includes a primary serving cell (PCell) 502 and one or more secondary serving cells (SCells) 506a, 506b, 506c, and 506d. The PCell 502 may be referred to as the anchor cell that provides a radio resource control (RRC) connection to the UE 510. In some examples, the PCell and the SCell may be co-located (e.g., different TRPs at the same location). The UE 510 may correspond to any of the UEs or scheduled entities shown in any of FIGS. 1, 2, 4, and 6-12.

One or more of the SCells 506a-506d may be activated or added to the PCell 502 to form the serving cells serving the UE 510. Each serving cell corresponds to a component carrier (CC). The CC of the PCell 502 may be referred to as a primary CC, and the CC of a SCell 506a-506d may be referred to as a secondary CC. The PCell 502 and one or more of the SCells 506 may be served by a respective base station 504 and 508a-508c or scheduling entity similar to those illustrated in any of FIGS. 1, 2, 4, and 6-13. In the example shown in FIG. 5, SCells 506a-506c are each served by a respective base station 508a-508c. SCell 506d is co-located with the PCell 502. For example, the base station 504 may include multiple TRPs, each supporting a different carrier. The coverages of the PCell 502 and SCell 506d may differ since component carriers in different frequency bands may experience different path loss.

In some examples, the PCell 502 may add or remove one or more of the SCells 506a-506d to improve reliability of the connection to the UE 510 and/or increase the data rate. The PCell 502 may be changed upon a handover to another PCell.

In some examples, the PCell 502 may utilize a first radio access technology (RAT), such as LTE, while one or more of the SCells 506 may utilize a second RAT, such as 5G-NR. In this example, the multi-cell transmission environment may be referred to as a multi-RAT-dual connectivity (MR-DC) environment. One example of MR-DC is Evolved-Universal Terrestrial Radio Access Network (E-UTRAN)-New Radio (NR) dual connectivity (EN-DC) mode that enables a UE to simultaneously connect to an LTE base station and a NR base station to receive data packets from and send data packets to both the LTE base station and the NR base station.

In some examples, the PCell 502 may be a low band cell, and the SCells 506 may be high band cells. A low band (LB) cell uses a CC in a frequency band lower than that of the high band cells. For example, the high band cells may use millimeter wave (mmW) CC, and the low band cell may use a CC in a band (e.g., sub-6 GHz band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

Figure 6:
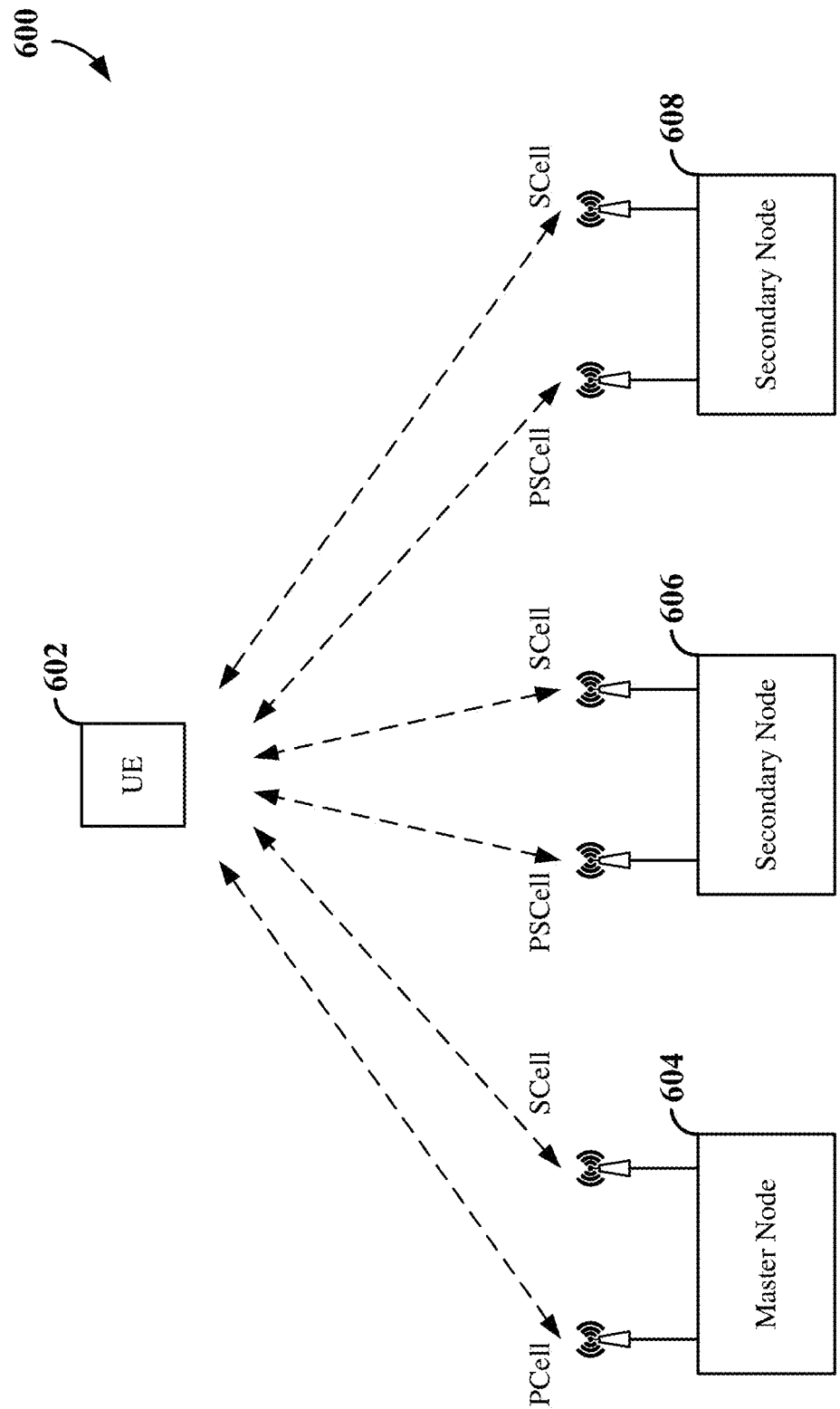
FIG. 6 is a conceptual illustration of an example of a master cell group (MCG) and secondary cell groups (SCGs) according to some aspects.

FIG. 6 is a conceptual illustration of a wireless communication system where a UE 602 may be served by a master node (MN) 604 and one or more secondary nodes (e.g., a first secondary node (SN) 606 and/or a second SN 608). A master cell group (MCG) is associated with the MN 604 and includes a PCell and an SCell in this example. A first secondary cell group (SCG) is associated with the first SN 606 and includes two SCells in this example. A second SCG is associated with the second SN 608 and includes two SCells in this example. Different examples may include a different number of SCells. The UE 602 may correspond to any of the UEs or scheduled entities shown in any of FIGS. 1, 2, 4, 5, and 7-12. The MN 604 may correspond to any of the BSs (e.g., gNBs, eNBs, MNs, etc.) or scheduling entities shown in any of FIGS. 1, 2, 4, 5, and 7-13. The first SN 606 and the second SN 608 may correspond to any of the BSs (e.g., gNBs, eNBs, SNs, etc.) or scheduling entities shown in any of FIGS. 1, 2, 4, 5, and 7-13.

The MN 604 may select the first SCG or the second SCG for an MR-DC configuration. The MN 604 may then select one of the SCells of the selected SCG to be the PSCell for the SCG (e.g., as indicated in FIG. 6). Thus, for a PSCell selection process, one or more of the SCells of an SCG may be deemed to be a candidate PSCell.

The PSCell(s) used for serving the UE 602 may change over time. For example, due to traffic conditions at the MN 604 or some other factor, the MN 604 may elect to add another PSCell for serving the UE 602. As another example, due to signaling conditions between the UE 602 and one or more of the current PSCells (e.g., as determined from signal measurements made by the UE 602), the MN 604 or one of the PSCells may elect to change out one or more PSCells. For example, a current PSCell (which may be referred to as a source SN) may identify (e.g., based on signal measurements by the UE 602) another PSCell (which may be referred to as a target SN or target PSCell) that will provide better service for the UE 602.

The disclosure relates in some aspect to signaling and related procedures for adding a PSCell and/or changing a PSCell configuration. In some aspects, adding/changing a PSCell configuration may be conditional in that an addition of a target PCell or a change to a target PSCell may be conditioned on signal measurements made at the UE. Here, the UE may verify whether the signaling conditions between the UE and the target PCell are acceptable. If so (e.g., the reference signal received power (RSRP) measured at the UE meets a defined criterion), the addition or change may be made.

In a wireless communication system, dual connectivity (DC) aims to utilize radio resources within multiple carriers. DC can be used to increase throughput, provide mobility robustness, support load-balancing among network nodes, and/or the like. A DC mode of operation is a mode in which a UE (e.g., the UE 602) is configured to utilize radio resources of two distinct schedulers located in two network nodes (e.g., the MN 604 and the first SN 606). These network nodes are referred to as a master node (MN) and a secondary node (SN). Thus, DC enables a UE to simultaneously transmit and receive data on multiple component carriers from groups of cells via the MN and the SN. In the context of DC, a master cell group (MCG) is a group of serving cells associated with the MN and includes a primary cell (PCell) and optionally one or more secondary cells (SCells). Further, a secondary cell group (SCG) is a group of serving cells associated with the SN and includes a primary secondary cell (PSCell) and optionally one or more SCells.

As mentioned above, one example of MR-DC is E-UTRAN NR-DC, which is referred to as EN-DC. EN-DC allows a UE to connect to an LTE base station (e.g., that acts as an MN) and an NR base station (e.g., that acts as an SN). An EN-DC enabled UE registers with an LTE core network (i.e., the LTE evolved packet core (EPC)) and reports measurements on NR frequencies. If signal quality for the UE supports NR service, then the LTE base station communicates with the NR base station to assign resources for a bearer. The NR resource assignment is then signaled to the UE via an LTE radio resource control (RRC) connection reconfiguration message. Once the RRC connection reconfiguration procedure is complete, the UE simultaneously connects to the LTE and NR networks. In EN-DC, a secondary cell group addition is performed using an RRC procedure. For example, an RRC connection reconfiguration procedure may be used to add, modify, or release a secondary cell group based on NR measurements performed by the UE.

In MR-DC operation, a conditional PSCell addition procedure can be performed to cause a candidate target PSCell of a target SN to be added in association with serving a UE. Here, the conditional PSCell addition is performed based on the UE detecting that a condition for the conditional PSCell addition has been satisfied for the target candidate PSCell. Similarly, in MR-DC operation, a conditional PSCell change procedure can be performed to cause a PSCell serving the UE to be changed from a source PSCell to a candidate target PSCell. The candidate target PSCell may be associated with the source SN (i.e., the conditional PSCell change may be intra-SN) or may be associated with a target SN (i.e., the conditional PSCell change may be inter-SN). The conditional PSCell change may be performed based on the UE detecting that a condition for the conditional PSCell change has been satisfied for the target candidate PSCell. A conditional PSCell addition or a conditional PSCell change can be initiated by the MN or can be initiated by the SN.

The disclosure relates in some aspects to techniques and apparatuses for signaling aspects of a conditional PSCell change procedure (e.g., in MR-DC) to ensure reliable performance of the conditional PSCell change. The signaling aspects of a conditional PSCell change procedure in MR-DC are described below in the context of various types of conditional PSCell change procedures.

FIGS. 7, 8, 9, 10, 11, and 12 are diagrams illustrating examples associated with signaling aspects of a conditional PSCell change procedure in MR-DC, in accordance with various aspects of the present disclosure. In FIGS. 7, 8, 9, 10, 11, and 12, an MR-DC UE (e.g., the UE 602 of FIG. 6) is connected to an MN (e.g., the MN 604 of FIG. 6) and an SN (e.g., the first SN 606 of FIG. 6), and a source PSCell serving the UE is associated with the SN.

The disclosure relates in some aspects to an MN-initiated conditional PSCell addition (CPA) where an MN may modify a MCG configuration based on the information from the target SN. For example, based on the set of MN-terminated RBs the target SN cannot admit, the MN may drop those RBs from the MCG configuration.

The disclosure relates in some aspects to an MN-initiated CPA where, for each target PSCell, the target SN provides the target PSCell ID at the top level of SN Addition Request Acknowledge message for the MN to use to configure the CPA execution condition.

Figure 7:
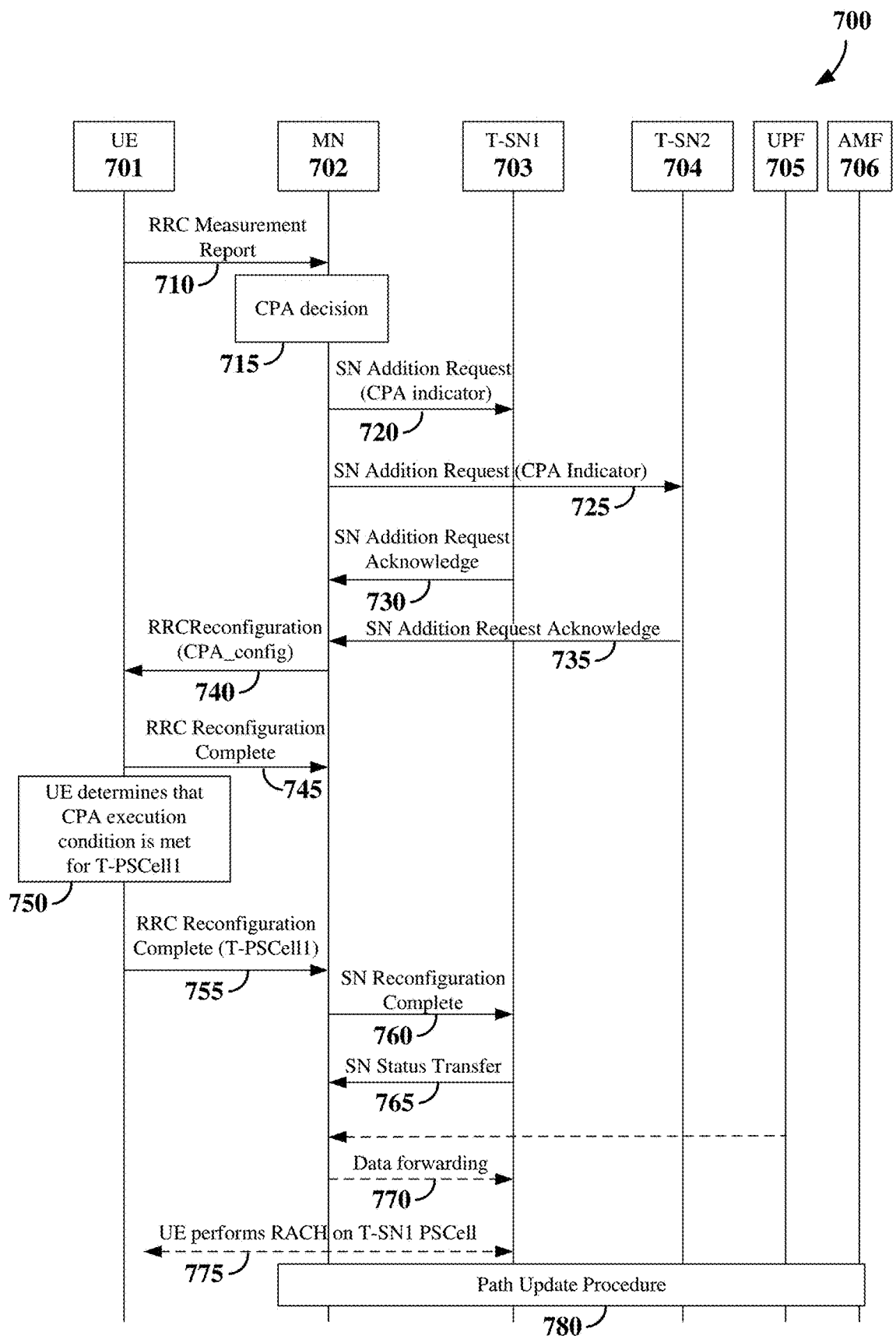
FIG. 7 is a signaling diagram illustrating an example of signaling for a master node (MN) initiated conditional primary secondary cell (PSCell) addition according to some aspects.

FIG. 7 is a diagram illustrating an example of an MN-initiated CPA procedure 700 in a wireless communication system including a UE 701, an MN 702, a first target SN (T-SN1) 703, a second target SN (T-SN2) 704, a UPF 705, and an AMF 706. The UE 701 may correspond to any of the UEs or scheduled entities shown in any of FIGS. 1, 2, 4-6, and 8-12. The MN 702 may correspond to any of the BSs (e.g., gNBs, eNBs, MNs, etc.) or scheduling entities shown in any of FIGS. 1, 2, 4-6, and 8-13. The T-SN1 703 and the T-SN2 704 may correspond to any of the BSs (e.g., gNBs, eNBs, SNs, etc.) or scheduling entities shown in any of FIGS. 1, 2, 4-6, and 8-13. The UPF 705 may correspond to any of the UPFs shown in any of FIGS. 4 and 8-12. The AMF 706 may correspond to any of the AMFs shown in any of FIGS. 4 and 8-12.

In the MN-initiated CPA procedure 700, a candidate target PSCell is being added. Here, the MN 702 determines the set of target SNs and the candidate target PSCells for each target SN. For each candidate target PSCell, the MN 702 determines the CPA execution condition. In some examples, the CPA execution condition involves comparing a target cell signal strength measured by the UE 701 to a threshold, e.g., target cell>=threshold (event A4).

In an SN Addition Request sent to each target SN, the MN 702 includes the information that follows. (1) The target PSCells in the candidate cell information list in CGConfigInfo for the target SN to consider configuring. (2) A set of MN RBs (e.g., MN-terminated split bearers) to set up, and the SCG resources required.

Upon receiving an SN Addition Request, a target SN determines the set of target PSCells to be included in CPA configuration to be sent to UE 701. In response to the SN Addition Request, the target SN transmits an SN Addition Request Acknowledge.

In the SN Addition Request Acknowledge, the target SN may include the information that follows. (1) A target PSCell and SCG configuration, including the radio bearer (RB) configuration, per target PSCell. (2) For each target PSCell, the target SN indicates the set of RBs it can and cannot admit.

The MN 702 determines the CPA configuration to be provided to UE 701. The MN 702 may modify the MCG configuration based on the information from the target SN. For example, based on the set of MN-terminated RBs the target SN cannot admit, the MN 702 may drop those RBs from the MCG configuration. For each target PSCell, the MN 702 then combines the MCG configuration with the provided SCG configuration from the target SN (which it does not alter) to be forwarded to the UE 701 as part of the CPA configuration.

The CPA configuration may also consist of the CPA execution condition for each target PSCell. For each target PSCell, the target SN provides the target PSCell ID at the top level of the SN Addition Request Acknowledge message for the MN 702 to use to configure the CPA execution condition. In some examples, the top level of the SN Addition Request Acknowledge message corresponds to a top level of a corresponding information element (IE) structure that is visible to the MN 702.

Referring to FIG. 7, as shown by operation 710, the UE 701 may provide a measurement report (e.g., an RRC measurement report) to the MN 702. In some aspects, the measurement report may include a result of a measurement associated with the source PSCell of the UE 701 and/or results of measurements associated with a group of candidate target PSCells.

As shown by operation 715, the MN 702 may determine that a conditional PSCell addition (CPA) procedure is to be initiated based at least in part on the measurement report. For example, the MN 702 may determine that additional cells are needed to serve the UE 701, and may determine that the conditional PSCell addition procedure is to be initiated.

As shown by operations 720 and 725, the MN 702 may, based at least in part on a set of candidate target SN identifiers associated with a set of candidate target PSCells for the UE 701, transmit an SN addition request message to each of the candidate target SNs (T-SN1 703 and T-SN2 704 in this example). As shown, in some aspects, the SN addition request message may include a conditional PSCell addition (CPA) indicator (e.g., an indication that the requested SN addition is associated with a conditional PSCell addition procedure).

As shown by operations 730 and 735, each candidate target SN may transmit, to the MN 702, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved).

As shown by operation 740, the MN 702 may transmit a reconfiguration message (e.g., an RRC reconfiguration message) to the UE 701. As shown, in some aspects, the reconfiguration message may include configuration information associated with the conditional PSCell addition. The configuration information may include, for example, information associated with each of the set of candidate target PSCells. As further shown, the reconfiguration message may include information indicating a condition for each candidate target PSCell that, if satisfied, is to cause the UE 701 to execute the conditional PSCell addition.

As shown by operation 745, after the UE 701 receives the reconfiguration message, the UE 701 may provide a reconfiguration complete message (e.g., an RRC reconfiguration complete message) to the MN 702.

As shown by operation 750, the UE 701 may determine that a condition for the conditional PSCell addition has been satisfied for a candidate target PSCell (e.g., one of the set of candidate target PSCells). For example the UE 701 may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like.

As shown by operation 755, the UE 701 may transmit to the MN 702 a reconfiguration complete message (e.g., an RRC reconfiguration complete message) indicating that the UE 701 has determined that the condition for the conditional PSCell addition has been satisfied for the candidate target PSCell. In some aspects, the message includes information that identifies the candidate target PSCell (T-PSCell1 in this example) for which the UE 701 has determined the condition to be satisfied.

As shown by operation 760, the MN 702 may transmit a confirmation message (e.g., an SN reconfiguration complete message) associated with the conditional PSCell addition to the selected SN (the selected target PSCell).

As shown by operation 765, the selected SN may transmit an SN status transfer message to the MN 702, after which data forwarding can begin, as indicated by operation 770. As shown by operation 775, the UE 701 may perform a random access channel (RACH) procedure on the candidate target PSCell and, as shown by operation 780, a path update procedure may be performed.

In the MN-initiated CPA procedure 700 of FIG. 7, the RRCReconfiguration message (operation 740) may contain the information that follows. A set of candidate target PSCells. An execution condition (e.g., based on events and measurement thresholds) to be met for accessing a target PSCell. A configuration to be used after the UE 701 accesses the target PSCell.

The RRCReconfigurationComplete (operation 755) contains the selected target PSCell so that the MN 702 can forward the SN Reconfiguration Complete to a corresponding target SN (T-SN). In operations 730 and 735, each T-SN provides a data forwarding address to the MN 702 (e.g., for bearers whose termination point is moved from the MN 702 to the selected SN). The MN 702 can thus transmit the SN Status Transfer and start data forwarding to the selected T-SN after sending the SN Reconfiguration Complete. Operation 775 may take place in parallel with operations 755-770.

In another example, the disclosure relates in some aspects to an SN-initiated conditional PSCell change (CPC) where the source SN may include CPC execution condition information in the SN Change Required message sent to the MN. For example, for each target SN in the cell group configuration (CG-Config), the source SN may send the CPC execution condition for each candidate target PSCell. In some examples, the CPC execution condition involves comparing a source cell and neighbor cell signal strengths measured by a UE (e.g., neighbor>=source+offset (event A3)).

The disclosure also relates in some aspects to an SN-initiated conditional PSCell change (CPC) where the MN may include the CPC execution conditions for the target PSCells in the SN Addition Request sent to a target SN.

The disclosure also relates in some aspects to an SN-initiated conditional PSCell change (CPC) where a target SN may include, in an SN Addition Request Acknowledge, a CPC configuration that includes the CPC execution conditions for each target PSCell.

The disclosure also relates in some aspects to an SN-initiated conditional PSCell change (CPC) where an MN modifies the MCG configuration based on the information from the target SN. For example, based on the set of MN-terminated RBs the target SN cannot admit, the MN may drop those RBs from the MCG configuration. For each target PSCell, the MN may combine the MCG configuration with the provided SCG configuration and CPC execution condition from the target SN, and provide the resulting CPC configuration to the UE.

The disclosure also relates in some aspects to an SN-initiated conditional PSCell change (CPC) where the MN does not include the CPC execution conditions in SN Addition Request messages. For this example, in the SN Addition Request Acknowledge, the target SN does not include the execution condition for each target PSCell, but does provide the target PSCell ID at the top level of SN Addition Request Acknowledge message.

Figure 8:
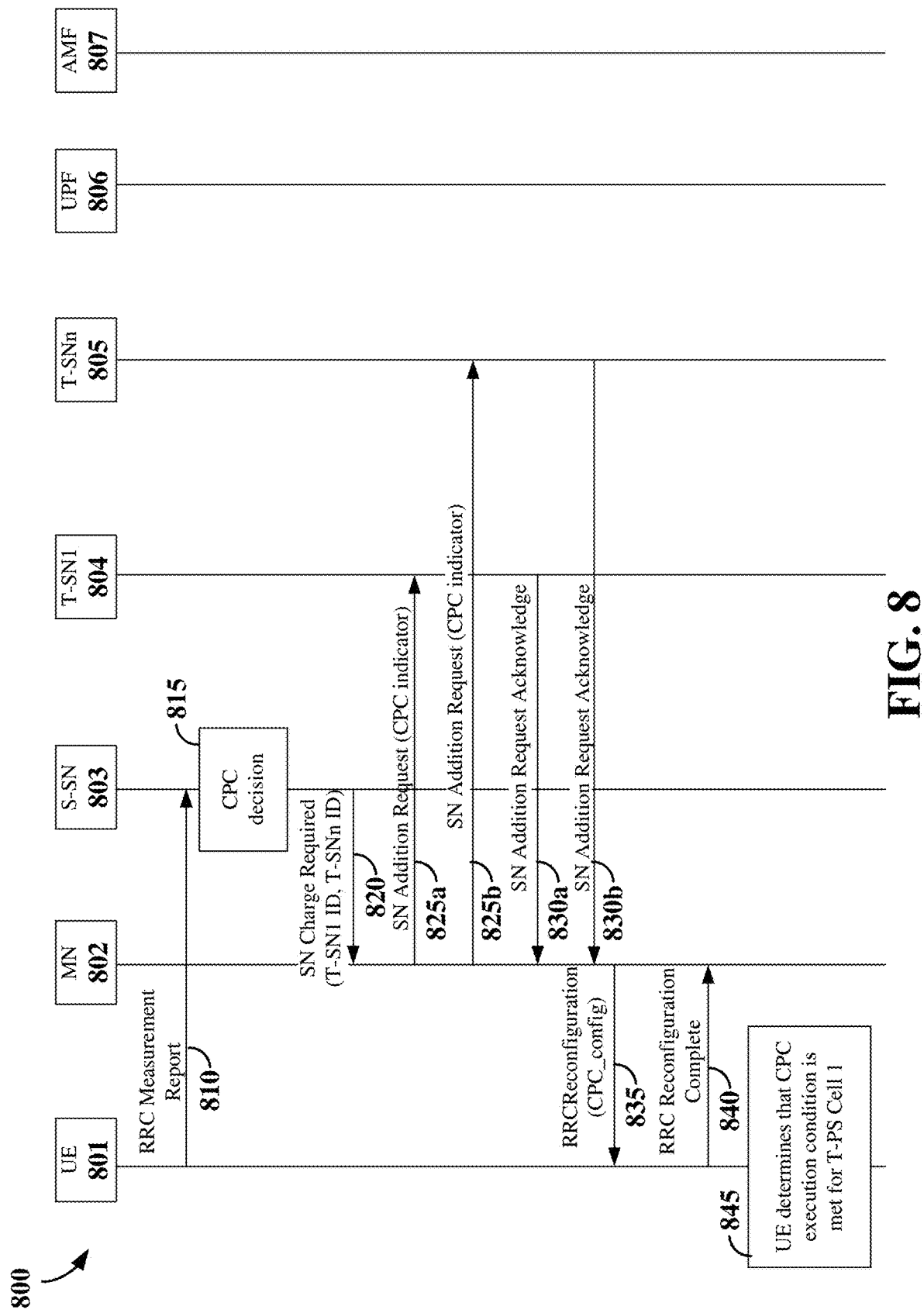
FIGS. 8 and 9 are a signaling diagram illustrating an example of signaling for a secondary node (SN) initiated conditional PSCell change according to some aspects.
Figure 9:
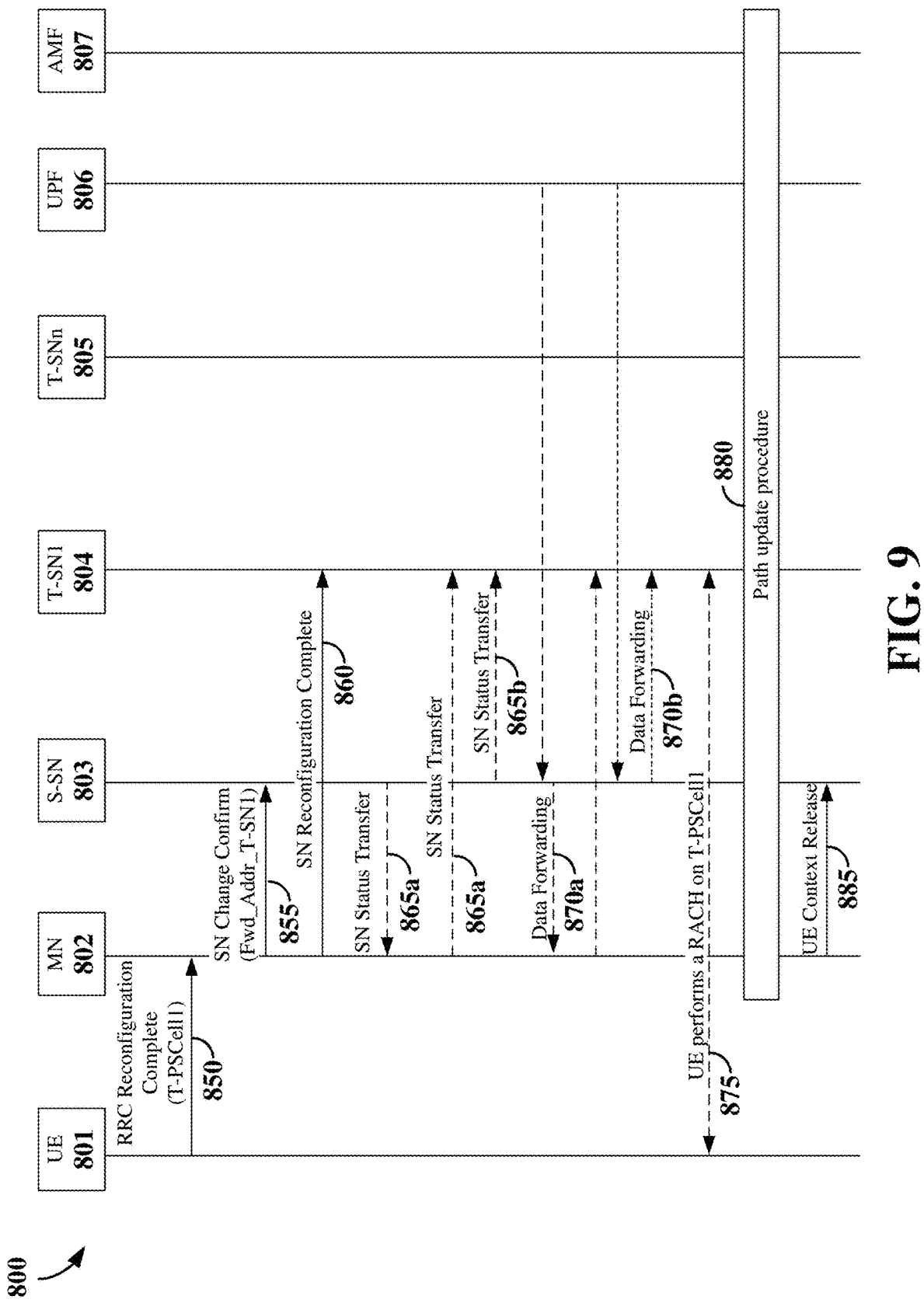

FIGS. 8 and 9 are diagrams illustrating an example of an SN-initiated conditional PSCell change procedure 800 in a wireless communication system including a UE 801, an MN 802, a source SN (S-SN) 803, a first target SN (T-SN1) 804, an Nth target SN (T-SNn) 805, a UPF 806, and an AMF 807. The UE 801 may correspond to any of the UEs or scheduled entities shown in any of FIGS. 1, 2, 4-7, and 10-12. The MN 802 may correspond to any of the BSs (e.g., gNBs, eNBs, MNs, etc.) or scheduling entities shown in any of FIGS. 1, 2, 4-7, and 10-13. The S-SN 803, the T-SN1 804 and the T-SNn 805 may correspond to any of the BSs (e.g., gNBs, eNBs, SNs, etc.) or scheduling entities shown in any of FIGS. 1, 2, 4-7, and 10-13. The UPF 806 may correspond to any of the UPFs shown in any of FIGS. 4, 7 and 10-12. The AMF 807 may correspond to any of the AMFs shown in any of FIGS. 4, 7, and 10-12.

In the SN-initiated conditional PSCell change procedure 800, the SN is a source SN and the PSCell is being changed to a candidate target PSCell associated with a target SN (e.g., the second SN 608). That is, the conditional PSCell change is an inter-SN conditional PSCell change in the example of FIGS. 8 and 9.

For a CPC configuration in the case of an SN-initiated Inter-SN CPC, the source SN determines the set of target SNs and the set of candidate target PSCells for each target SN. The source SN may include the information that follows in the SN Change Required message sent to the MN 802. (1) A list of target SNs (e.g., Target SN IDs). (2) For each target SN, an indication of the candidate target PSCells in the candidate cell info list in the CG-Config for the target SN to consider configuring. (3) For each target SN, in the CG-Config, the CPC execution condition for each candidate target PSCell (e.g., neighbor>=source+offset (event A3)). (4) The source SCG configuration and the set of SN-terminated RBs to be set up.

In the SN Addition Request to a target SN, the MN 802 may include the information that follows. (1) The MN 802 may forward identifiers of the candidate target PSCells, the CPC execution conditions for the target PSCells, the source SCG configuration and the set of SN-terminated RBs to set up, included in the SN Change Required. (2) The set of MN RBs (e.g., MN-terminated split bearers) for the target SN to consider configuring, and the SCG resources required.

Each target SN determines the set of target PSCells to be included in the CPC configuration. In the SN Addition Request Acknowledge, a target SN may include the CPC configuration information that follows. (1) The target PSCells and SCG configuration, including the RB configuration, per target PSCell. (2) The CPC execution condition for each target PSCell. (3) For each target PSCell, the target SN indicates the set of RBs it can and cannot admit.

The MN 802 may modify the MCG configuration based on the information from the target SN. For example, if the information indicates the set of MN-terminated RBs the target SN cannot admit, the MN 802 drops those RBs from the MCG configuration. For each target PSCell, the MN 802 then combines the MCG configuration with the provided SCG configuration and CPC execution condition from the target SN, and provides the resulting CPC configuration to the UE 801.

In an alternative procedure, the MN 802 does not include the CPC execution conditions in SN Addition Request messages. In the SN Addition Request Acknowledge, the target SN does not include the execution condition for each target PSCell, but does provide the target PSCell ID at the top level of SN Addition Request Acknowledge message. For each target PSCell, the MN 802 then combines the MCG configuration and the CPC execution condition with the provided SCG configuration from the target SN, and provides the resulting CPC configuration to the UE 801.

Referring initially to FIG. 8, as shown by operation 810, the UE 801 may provide, to the source SN, a measurement report (e.g., an RRC measurement report). In some aspects, the measurement report may include a result of a measurement associated with the source PSCell of the UE 801 and results of measurements associated with a group of candidate target PSCells. Here, the group of candidate target PSCells includes one or more candidate target PSCells configured on the UE 801 (e.g., at an earlier time).

As shown by operation 815, the source SN may determine that a conditional PSCell change (CPC) procedure is to be initiated based at least in part on the measurement report. For example, the source SN may determine that a result of a measurement associated with the source PSCell fails to satisfy a threshold (e.g., a signal strength associated with the source PSCell is below a signal strength threshold), and may determine that the conditional PSCell change procedure is to be initiated.

As shown by operation 820, the source SN may transmit, to the MN 802, a change required message (e.g., an SN change required message) based at least in part on determining that the conditional PSCell change procedure is to be initiated. In some aspects, the change required message may include an indicator indicating that a conditional PSCell change procedure is being initiated. In some aspects, as indicated in FIG. 8, the change message may include a set of n (n≥1) candidate target SN identifiers (e.g., T-SN1 ID, T-SNn ID). Here, each candidate target SN identifier corresponds to a respective candidate target SN for the UE 801 included in a set of candidate target SNs.

As shown by operations 825*a* and 825*b*, the MN 802 may, based at least in part on the set of candidate target SN identifiers, transmit an SN addition request message to each of the candidate target SNs (T-SN1 804 and T-SNn 805 in this example). As shown, in some aspects, the SN addition request message may include a conditional PSCell change (CPC) indicator (e.g., an indication that the requested SN addition is associated with a conditional PSCell change procedure).

As shown by operations 830*a* and 830*b*, each candidate target SN may transmit, to the MN 802, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved).

As shown by operation 835, the MN 802 may, upon receiving the acknowledgments from the set of candidate target SNs, transmit a reconfiguration message (e.g., an RRC reconfiguration message) to the UE 801. As shown, in some aspects, the reconfiguration message may include configuration information associated with the conditional PSCell change (e.g., CPC_config). The configuration information may include, for example, information associated with each of the set of candidate target PSCells. As a further example, the reconfiguration message may include information indicating a condition for each candidate target PSCell (e.g., T-PSCell1_CPC_exec_thresh, T-PSCell2_CPC_exec_thresh, and/or the like) that, if satisfied, is to cause the UE 801 to execute the conditional PSCell change.

As shown by operation 840, after the UE 801 receives the reconfiguration message, the UE 801 may provide a reconfiguration complete message (e.g., an RRC reconfiguration complete message) to the MN 802.

As shown by operation 845, the UE 801 may determine that a condition for the conditional PSCell change has been satisfied for a candidate target PSCell (e.g., one of the set of candidate target PSCells). For example, the UE 801 may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount identified by a condition indicated for the candidate target PSCell, and/or the like.

As shown in FIG. 9 by operation 850, the UE 801 may transmit a reconfiguration complete message (e.g., an RRC reconfiguration complete message) indicating that the UE 801 has determined that the condition for the conditional PSCell change has been satisfied for the candidate target PSCell. In some aspects, the message includes information that identifies the candidate target PSCell (T-PSCell1 in this example) for which the UE 801 has determined the condition to be satisfied.

In some aspects, based at least in part on receiving the reconfiguration complete message, the MN 802 may further transmit, to one or more candidate target SNs, a request to release reserved resources of candidate target PSCells associated with the one or more other candidate target SNs. In some aspects, the request may include a list of candidate target PSCells for which reserved resources are to be released at the one or more other target SNs. In some aspects, the one or more candidate target SNs may release the reserved resources of the candidate target PSCell based at least in part on the request.

As shown by operation 855, the MN 802 may transmit a confirmation message (e.g., an SN change confirm message) associated with the conditional PSCell change to the source SN. In some aspects, as shown, the confirmation message includes a data forwarding address of the target SN (e.g., Fwd_Addr_T-SN1) associated with the candidate target PSCell (e.g., so that the source SN can forward data directly to the target SN). In some aspects, the confirmation includes a data forwarding address of the MN 802 (e.g., so that the source SN can forward data to the target SN via the MN 802). In some aspects, upon receiving the confirmation message, the source SN releases resources for the UE 801.

As shown by operation 860, the MN 802 may transmit an SN reconfiguration complete message to the target SN associated with the candidate target PSCell.

As shown by operations 865a and 865b, the MN 802 and the source SN may transmit respective SN status transfer messages to the target SN, after which data forwarding can begin, as indicated by operations 870a (indirect data forwarding) and 870b (direct data forwarding).

As shown by operation 875, the UE 801 may perform a random access channel (RACH) procedure on the candidate target PSCell. In some aspects, the UE 801 may perform the RACH procedure any time after determining that the condition for the conditional PSCell change has been satisfied for the candidate target PSCell (e.g., during a time at which operations associated with operations 850 through 870 are being performed).

As shown by operation 880, a path update procedure may be performed and, as shown by operation 885, the MN 802 may transmit a context release, associated with the UE 801, to the source SN.

In the SN-initiated conditional PSCell change procedure 800 of FIGS. 8 and 9, the RRCReconfiguration message (operation 835) may include the following information. (1) A set of candidate target PSCells, an execution condition to be met for accessing each target PSCell. (2) A configuration to be used after the UE 801 accesses the target PSCell.

In operation 855, the MN 802 transmits a data forwarding address provided by the T-SN1 to the S-SN for direct data forwarding, along with the MN 802's own address for indirect data forwarding. The source SN resources for the UE 801 are released upon receiving the SN Change Confirm. Operations 870a and 870b involve indirect data forwarding via the MN 802 and direct data forwarding, respectively. Operation 875 can take place in parallel with operations 870a-870b.

In another example, for a CPC configuration in the case of an MN-initiated Inter-SN CPC, the MN first uses the SN Modification procedure to obtain the current SCG configuration before initiating the procedure with the target SNs. The inter-node signaling and procedure for constructing the CPC configuration may be similar to the case of the MN-initiated CPA procedure.

Figure 10:
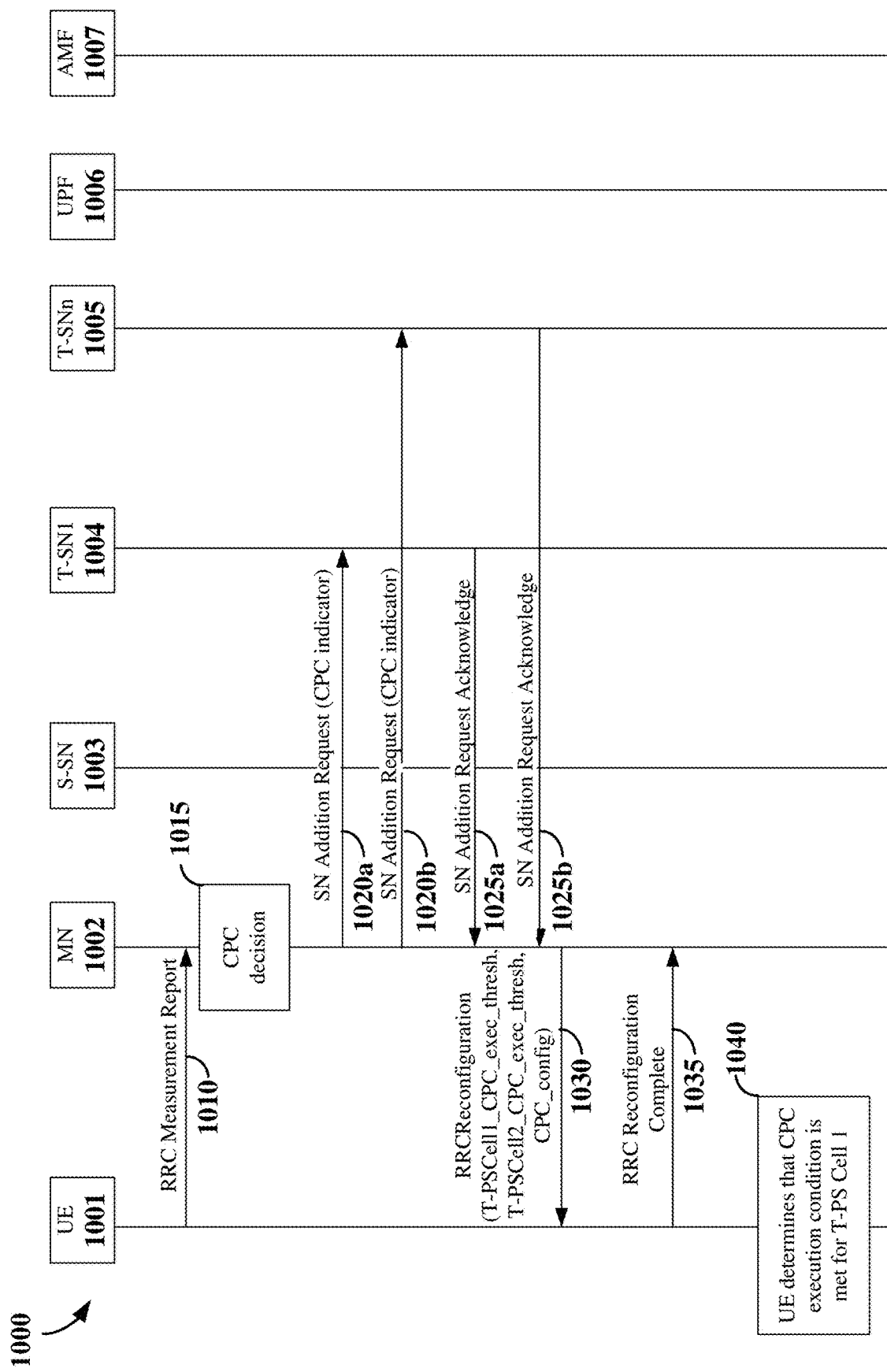
FIGS. 10 and 11 are a signaling diagram illustrating an example of signaling for an MN initiated conditional PSCell change according to some aspects.
Figure 11:
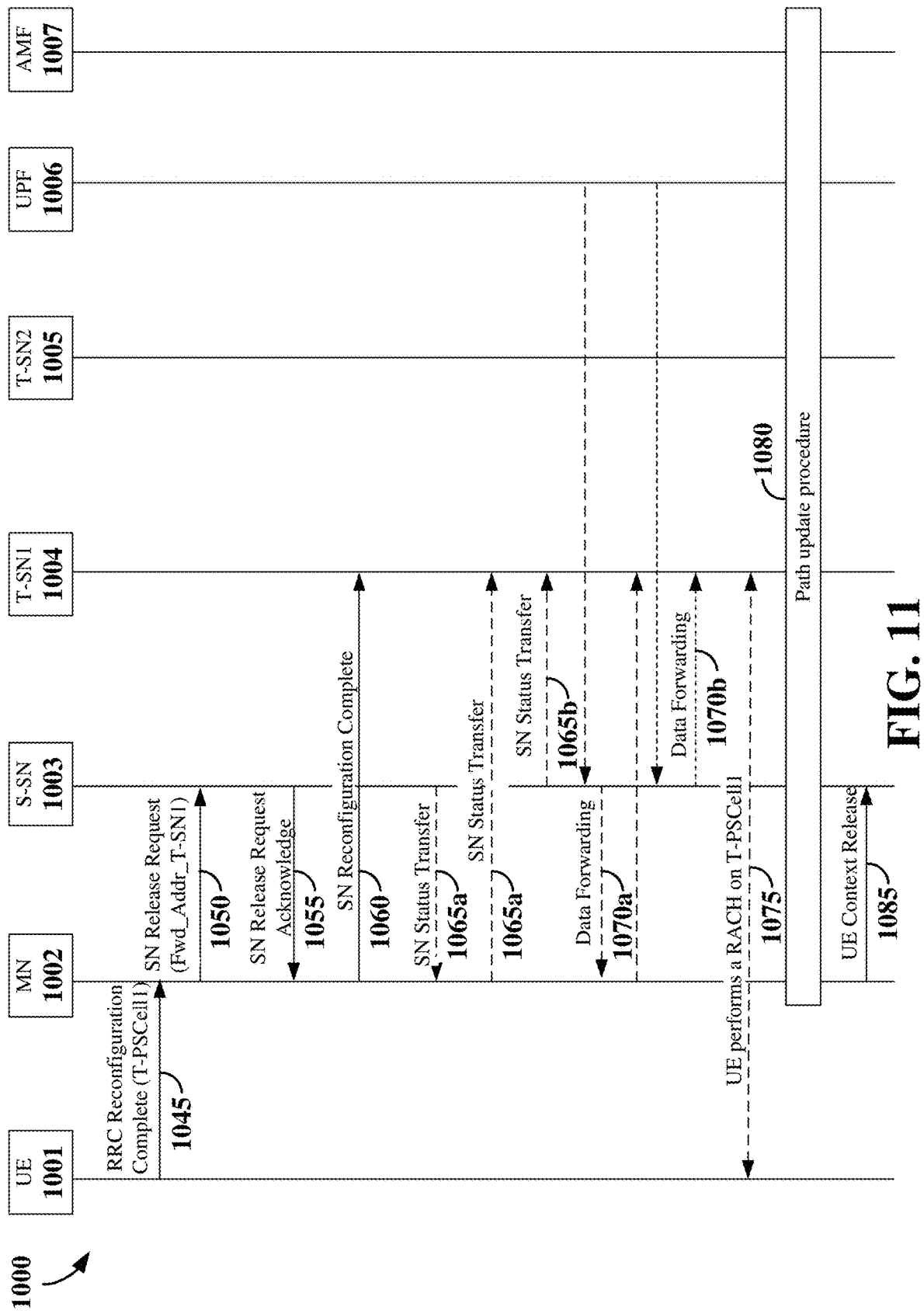

FIGS. 10 and 11 are diagrams illustrating an example 1000 of an MN-initiated conditional PSCell change procedure 1000 in a wireless communication system including a UE 1001, an MN 1002, a source SN (S-SN) 1003, a first target SN (T-SN1) 1004, an Nth target SN (T-SNn) 1005, a UPF 1006, and an AMF 1007. The UE 1001 may correspond to any of the UEs or scheduled entities shown in any of FIGS. 1, 2, 4-9, and 12. The MN 1002 may correspond to any of the BSs (e.g., gNBs, eNBs, MNs, etc.) or scheduling entities shown in any of FIGS. 1, 2, 4-9, 12, and 13. The S-SN 1003, the T-SN1 1004 and the T-SNn 1005 may correspond to any of the BSs (e.g., gNBs, eNBs, SNs, etc.) or scheduling entities shown in any of FIGS. 1, 2, 4-9, 12, and 13. The UPF 1006 may correspond to any of the UPFs shown in any of FIGS. 4, 7-9, and 12. The AMF 1007 may correspond to any of the AMFs shown in any of FIGS. 4, 7-9, and 12.

In the MN-initiated conditional PSCell change procedure 1000, the PSCell is being changed to a candidate target PSCell associated with a target SN. That is, the MN-initiated conditional PSCell change procedure 1000 involves an inter-SN conditional PSCell change.

As shown by operation 1010, the UE 1001 may provide, to the MN 1002, a measurement report (e.g., an RRC measurement report). In some aspects, the measurement report may include a result of a measurement associated with the source PSCell of the UE 1001 and/or results of measurements associated with a group of candidate target PSCells.

As shown by operation 1015, the MN 1002 may determine that a conditional PSCell change procedure is to be initiated based at least in part on the measurement report. For example, the MN 1002 may determine that a result of a measurement associated with the source PSCell fails to satisfy a threshold (e.g., that a signal strength associated with the source PSCell is below a signal strength threshold), and may determine that the conditional PSCell change is to be initiated.

As shown by operations 1020a and 1020b, the MN 1002 may, based at least in part on a set of candidate target SN identifiers associated with a set of candidate target PSCells for the UE 1001, transmit an SN addition request message to each of the candidate target SNs (T-SN1 1004 and T-SNn 1005 in this example). As shown, in some aspects, the SN addition request message may include a conditional PSCell change (CPC) indicator (e.g., an indication that the requested SN addition is associated with a conditional PSCell change procedure).

As shown by operations 1025a and 1025b, each candidate target SN may transmit, to the MN 1002, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved).

As shown by operation 1030, the MN 1002 may, upon receiving the acknowledgments from the set of candidate target SNs, transmit a reconfiguration message (e.g., an RRC reconfiguration message) to the UE 1001. As shown, in some aspects, the reconfiguration message may include configuration information associated with the conditional PSCell change. The configuration information may include, for example, information associated with each of the set of candidate target PSCells (e.g., T-PSCell1 and T-PSCell2). As further shown, the reconfiguration message may include information indicating a condition for each candidate target PSCell that, if satisfied, is to cause the UE 1001 to execute the conditional PSCell change.

As shown by operation 1035, after the UE 1001 receives the reconfiguration message, the UE 1001 may provide a reconfiguration complete message (e.g., an RRC reconfiguration complete message) to the MN 1002.

As shown by operation 1040, the UE 1001 may determine that a condition for the conditional PSCell change has been satisfied for a candidate target PSCell (e.g., one of the set of candidate target PSCells). For example the UE 1001 may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount identified by a condition indicated for the candidate target PSCell, and/or the like.

As shown in FIG. 11 by operation 1045, the UE 1001 may transmit a reconfiguration complete message (e.g., an RRC reconfiguration complete message) indicating that the UE 1001 has determined that the condition for the conditional PSCell change has been satisfied for the candidate target PSCell. In some aspects, the message includes information that identifies the candidate target PSCell (T-PSCell1 in this example) for which the UE 1001 has determined the condition to be satisfied.

In some aspects, based at least in part on receiving the reconfiguration complete message, the MN 1002 may further transmit, to one or more candidate target SNs, a request to release reserved resources of candidate target PSCells associated with the one or more other candidate target SNs. In some aspects, the request may include a list of candidate target PSCells for which reserved resources are to be released at the one or more other target SNs. In some aspects, the one or more candidate target SNs may release the reserved resources of the candidate target PSCell based at least in part on the request.

As shown by operation 1050, the MN 1002 may transmit a confirmation message (e.g., an SN release request message) associated with the conditional PSCell change to the source SN 1003. In some aspects, the confirmation message includes a data forwarding address of the target SN (T-SN1 1004 in this example) associated with the candidate target PSCell (e.g., so that the source SN 1003 can forward data directly to the target SN). In some aspects, the confirmation includes a data forwarding address of the MN 1002 (e.g., so that the source SN 1003 can forward data to the target SN via the MN 1002).

In some aspects, upon receiving the confirmation message, the source SN 1003 releases resources for the UE 1001. As shown by operation 1055, the source SN 1003 may transmit, and the MN 1002 may receive, an acknowledgment of the release request (e.g., an SN release request acknowledge message).

As shown by operation 1060, the MN 1002 may transmit an SN reconfiguration complete message to the target SN associated with the candidate target PSCell.

As shown by operations 1065a and 1065b, the MN 1002 and the source SN 1003 (via the MN 1002) may transmit respective SN status transfer messages to the target SN, after which data forwarding can begin, as indicated by operations 1070a (indirect data forwarding) and 1070b (direct data forwarding).

As shown by operation 1075, the UE 1001 may perform a random access channel (RACH) procedure on the candidate target PSCell. Notably, in some aspects, the UE 1001 may perform the RACH procedure any time after determining that the condition for the conditional PSCell change has been satisfied for the candidate target PSCell (e.g., during a time at which operations associated with operations 1050 through 1070b are being performed).

As shown by operation 1080, a path update procedure may be performed and, as shown by operation 1085, the MN 1002 may transmit a context release, associated with the UE 1001, to the source SN 1003.

In the MN-initiated conditional PSCell change procedure 1000 of FIGS. 10 and 11, at operation 1050, the MN 1002 transmits data forwarding addresses provided by the T-SN1 1004 to the S-SN for direct data forwarding, along with the MN 1002's address for indirect data forwarding. Source SN resources for the UE 1001 are released upon receiving the SN Release Request.

In another example, the disclosure relates in some aspects to an SN-initiated intra-SN conditional PSCell change (CPC) with MN involvement where the SN includes in the SN Modification Required message an execution condition for each target PSCell for the CPC configuration. The disclosure also relates in some aspects to an SN-initiated intra-SN conditional PSCell change with MN involvement where the MN includes in the SN Modification Request, for each target PSCell, the setup of SN-terminated split bearer(s).

The disclosure also relates in some aspects to an SN-initiated intra-SN conditional PSCell change with MN involvement where, upon reception of the SN Modification Request Acknowledge, the MN modifies the MCG configuration. For example, the MN may add the SN-terminated RBs that the SN indicates that it can admit.

The disclosure also relates in some aspects to an SN-initiated intra-SN conditional PSCell change with MN involvement where, for each target PSCell, the MN combines the MCG configuration with the provided SCG configuration and the CPC execution condition sent by the SN. The MN then provides the resulting CPC configuration to the UE.

Figure 12:
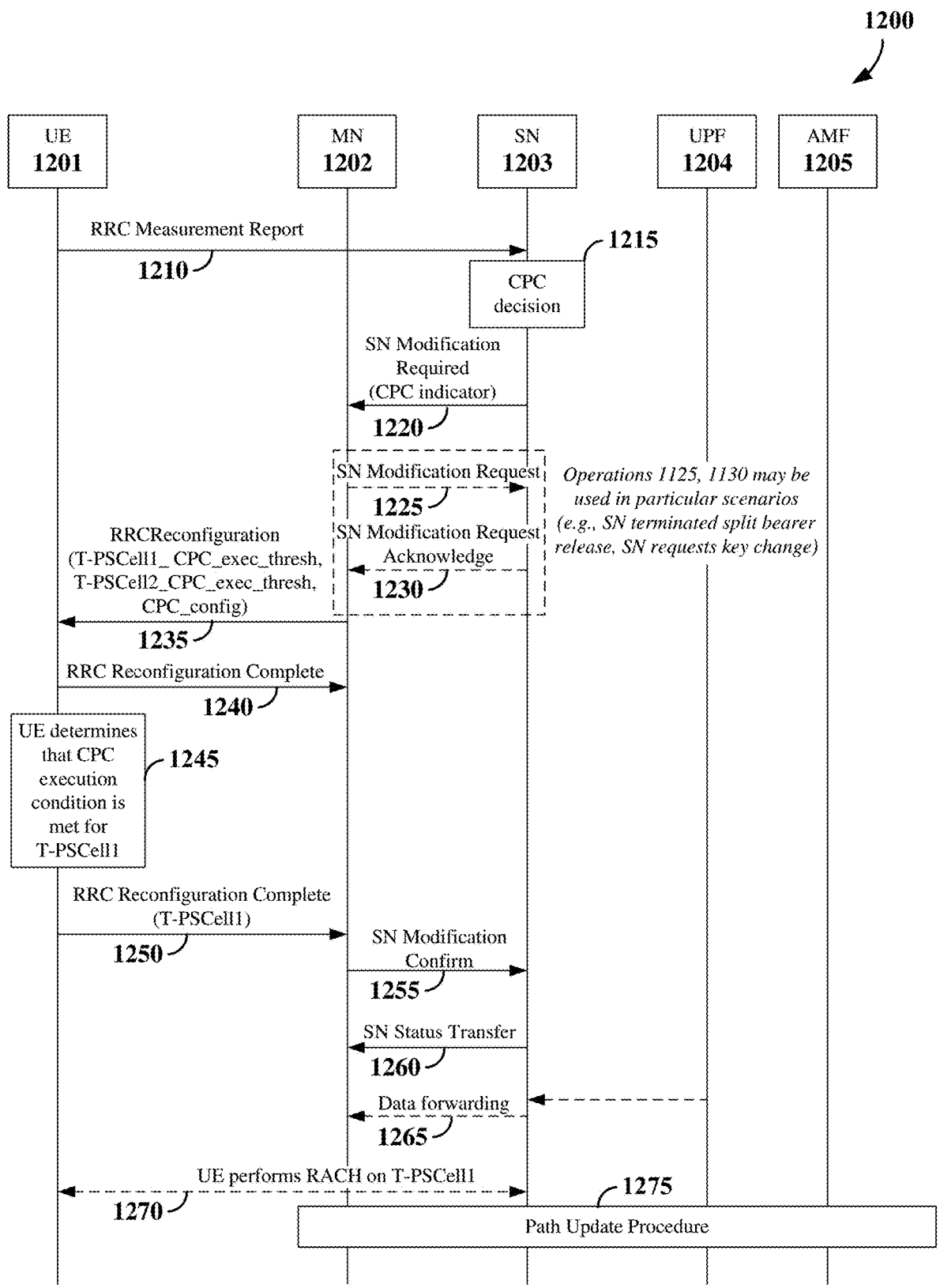
FIG. 12 is a signaling diagram illustrating an example of signaling for an SN initiated intra-SN conditional PSCell change with MN involvement according to some aspects.

FIG. 12 is a diagram illustrating an example 1200 of an SN-initiated intra-SN conditional PSCell change with MN involvement procedure 1200 in a wireless communication system including a UE 1201, an MN 1202, an SN 1203, a UPF 1204, and an AMF 1205. The UE 1201 may correspond to any of the UEs or scheduled entities shown in any of FIGS. 1, 2, and 4-11. The MN 1202 may correspond to any of the BSs (e.g., gNBs, eNBs, MNs, etc.) or scheduling entities shown in any of FIGS. 1, 2, 4-11, and 13. The SN 1203 may correspond to any of the BSs (e.g., gNBs, eNBs, SNs, etc.) or scheduling entities shown in any of FIGS. 1, 2, 4-11, and 13. The UPF 1204 may correspond to any of the UPFs shown in any of FIGS. 4 and 7-11. The AMF 1205 may correspond to any of the AMFs shown in any of FIGS. 4 and 7-11.

In the SN-initiated intra-SN conditional PSCell change with MN involvement procedure 1200, the PSCell is being changed to a candidate target PSCell associated with the SN 1203. That is, the conditional PSCell change is an intra-SN conditional PSCell change in this example.

As shown by operation 1210, the UE 1201 may provide, to the SN 1203, a measurement report (e.g., an RRC measurement report). In some aspects, the measurement report may include a result of a measurement associated with the source PSCell of the UE 1201 and/or results of measurements associated with a group of candidate target PSCells.

As shown by operation 1215, the SN 1203 may determine that a conditional PSCell change procedure is to be initiated based at least in part on the measurement report. For example, the SN 1203 may determine that a result of a measurement associated with the source PSCell fails to satisfy a threshold (e.g., that a signal strength associated with the source PSCell is below a signal strength threshold), and may determine that the conditional PSCell change is to be initiated.

As shown by operation 1220, the SN 1203 may transmit an SN modification required message to the MN 1202. As shown, in some aspects, the SN modification required message may include a conditional PSCell change (CPC) indicator (e.g., an indication that the requested SN modification is associated with a conditional PSCell change procedure).

As shown by optional operations 1225 and 1230, in some aspects, the MN 1202 may transmit an SN modification request to the SN 1203, and the SN 1203 may transmit, to the MN 1202, an acknowledgment of the SN modification request (e.g., an SN modification request acknowledge message).

For a CPC configuration in the case of an SN-initiated intra-SN conditional PSCell change with MN involvement, where operations 1225 and 1230 in the call-flow of FIG. 12 are not used, the SN 1203 provides the complete CPC configuration and includes it in the SN Modification Required message to the MN 1202 at operation 1220. The MN 1202 adds the MCG configuration before forwarding this information to the UE 1201.

In the case where operations 1225 and 1230 are used, in the SN Modification Required of operation 1220, the SN 1203 includes the information that follows. (1) For each target PSCell, a request to release a set of SCG bearer(s) and a request to release a set of MN-terminated split bearer(s). (2) An SN key update. (3) A set of target PSCells for the CPC configuration. (4) An execution condition for each target PSCell for the CPC configuration. (5) Target PSCell SCG configurations for the CPC configuration.

The MN 1202 may include in the SN Modification Request, for each target PSCell, the setup of SN-terminated split bearer(s), if required. The MN 1202 may also include a new SN key in the SN Modification Request.

Upon reception of the SN Modification Request Acknowledge, the MN 1202 may need to modify the MCG configuration. For example, the MN 1202 may add the SN-terminated RBs that the SN 1203 indicates that it can admit.

In the SN Modification Request Acknowledge, an SCG configuration for each target PSCell may also be provided. For example, the SCG configuration may be included when an SN-terminated split bearer is configured.

For each target PSCell, the MN 1202 combines the MCG configuration with the provided SCG configuration in operation 1220 or operation 1230 of FIG. 12 and the CPC execution condition sent by the SN 1203 in operation 1220. The MN 1202 then provides the resulting CPC configuration to the UE 1201.

As shown by operation 1235, the MN 1202 may transmit a reconfiguration message (e.g., an RRC reconfiguration message) to the UE 1201. As shown, in some aspects, the reconfiguration message may include configuration information associated with the conditional PSCell change. The configuration information may include, for example, information associated with each of the set of candidate target PSCells (T-PSCell1 and T-PSCell2 in this example). As further shown, the reconfiguration message may include information indicating a condition for each candidate target PSCell that, if satisfied, is to cause the UE 1201 to execute the conditional PSCell change.

As shown by operation 1240, after the UE 1201 receives the reconfiguration message, the UE 1201 may provide a reconfiguration complete message (e.g., an RRC reconfiguration complete message) to the MN 1202.

As shown by operation 1245, the UE 1201 may determine that a condition for the conditional PSCell change has been satisfied for a candidate target PSCell (e.g., one of the set of candidate target PSCells). For example the UE 1201 may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like.

As shown by operation 1250, the UE 1201 may transmit a reconfiguration complete message (e.g., an RRC reconfiguration complete message) indicating that the UE 1201 has determined that the condition for the conditional PSCell change has been satisfied for the candidate target PSCell. In some aspects, the message includes information that identifies the candidate target PSCell (T-PSCell1 in this example) for which the UE 1201 has determined the condition to be satisfied.

As shown by operation 1255, the MN 1202 may transmit a confirmation message (e.g., an SN reconfiguration complete message) associated with the conditional PSCell change to the SN 1203.

As shown by operation 1260, the SN 1203 may transmit an SN status transfer message to the MN 1202, after which data forwarding can begin, as indicated by operation 1265. As shown by operation 1270, the UE 1201 may perform a RACH procedure on the candidate target PSCell and, as shown by operation 1275, a path update procedure may be performed.

Figure 13:
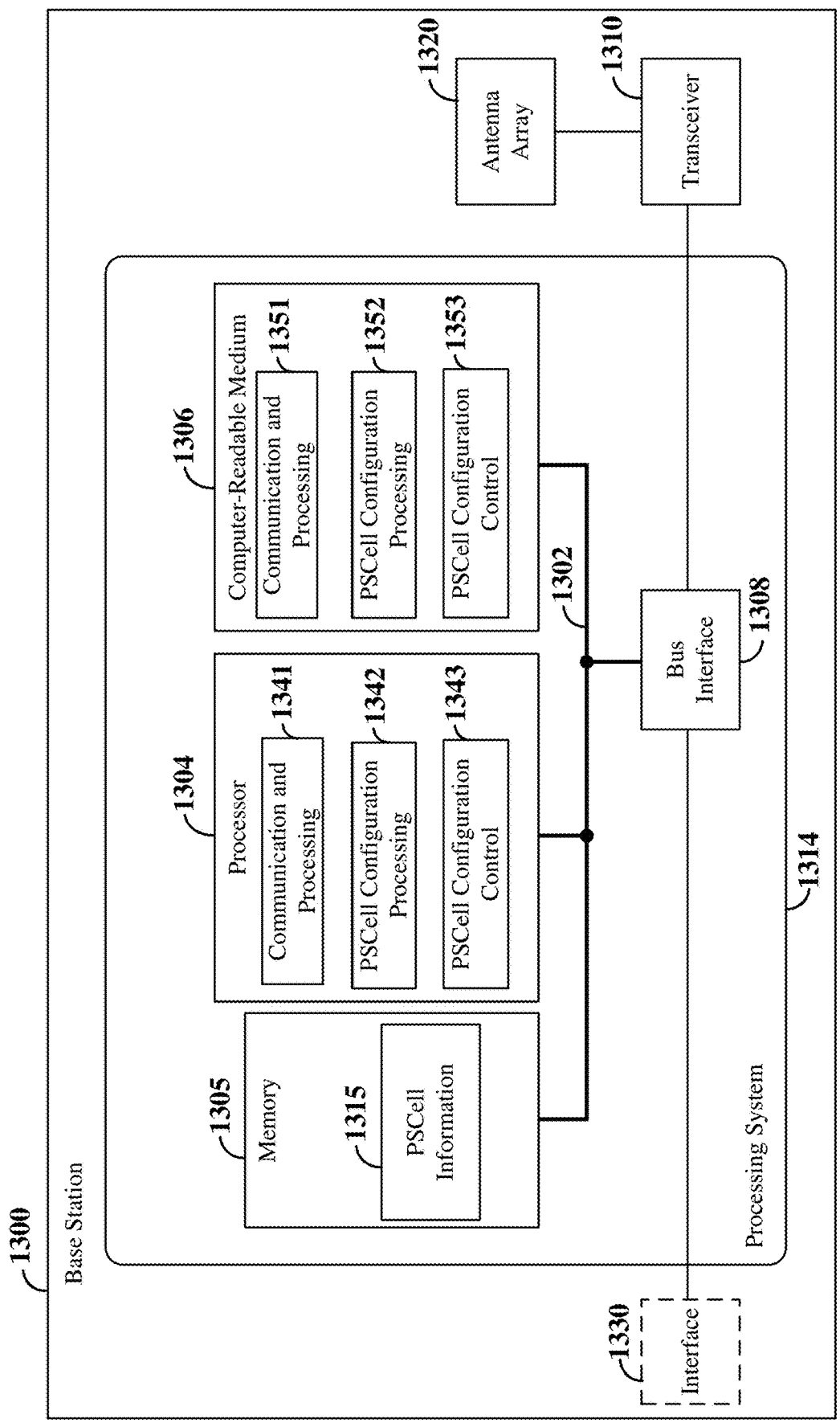
FIG. 13 is a block diagram illustrating an example of a hardware implementation for a base station employing a processing system according to some aspects.

FIG. 13 is a block diagram conceptually illustrating an example of a hardware implementation for a BS 1300 employing a processing system 1314 according to some aspects of the disclosure. In some examples, the BS 1300 may correspond to any of the BSs (e.g., gNBs, eNBs, MNs, SNs, etc.) or scheduling entities shown in any of FIGS. 1, 2, and 4-12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the BS 1300 may be configured to perform any one or more of the functions described herein. That is, the processor 1304, as utilized in a BS 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and an antenna array, and an interface between the bus 1302 and an interface 1330. The transceiver 1310 provides a communication interface or means for communicating with various other apparatus over a wireless transmission medium. In some examples, the wireless communication device may include two or more transceivers 1310, each configured to communicate with a respective network type. At least one interface 1330 (e.g., a network interface and/or a user interface) provides a communication interface or means of communicating with various other apparatus and devices (e.g., other devices housed within the same apparatus as the BS 1300 or an external apparatus) over an internal bus or external transmission medium, such as an Ethernet cable.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store PSCell information 1315 (e.g., identifiers, configurations, and associated information) used by the processor 1304 in cooperation with the transceiver 1310 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The BS 1300 may be configured to perform any one or more of the operations described herein (e.g., as described above in conjunction with FIGS. 1-12 and as described below in conjunction with FIGS. 14-19). In some aspects of the disclosure, the processor 1304, as utilized in the BS 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs.

The processor 1304 may include communication and processing circuitry 1341, configured to communicate with one or more other communication devices (e.g., base stations, UEs, etc.). In some examples, the communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

The communication and processing circuitry 1341 may further be configured to transmit messages to and receive message from a UE. For example, a transmitted message may be included in a MAC-CE carried in a PDSCH, DCI in a PDCCH or PDSCH, a random access message, or an RRC message. As another example, a received message may be included in a MAC-CE carried in a PUSCH, UCI in a PUCCH or PUSCH, a random access message, or an RRC message. The communication and processing circuitry 1341 may further be configured to receive a scheduling request (e.g., via UCI in a PUCCH) from the UE for an uplink grant for the PUSCH and send a grant (e.g., via DCI in a PDCCH) in response to the request.

In some implementations where the communication involves receiving information, the communication and processing circuitry 1341 may obtain information from a component of the BS 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting).

The communication and processing circuitry 1341 may include functionality for a means for obtaining (and/or means for receiving) an SCG configuration and an associated set of information for a target PSCell. For example, the communication and processing circuitry 1341 may be configured to receive one or more messages (e.g., an SN addition request acknowledgement message, an SN modification request acknowledgement message, an SN modification required message, or some other suitable message) from one or more SNs (e.g., via an x2 interface, an Xn interface, or some other suitable interface).

The communication and processing circuitry 1341 may include functionality for a means for obtaining (and/or means for receiving) a message (e.g., an SN addition request acknowledgement message) that includes an identifier of a target PSCell. For example, the communication and processing circuitry 1341 may be configured to receive messages from one or more SNs (e.g., via an x2 interface, an Xn interface, or some other suitable interface).

The processor 1304 may include PSCell configuration processing circuitry 1342 configured to perform PSCell configuration processing-related operations as discussed herein. The PSCell configuration processing circuitry 1342 may be configured to execute PSCell configuration processing software 1352 included on the computer-readable medium 1306 to implement one or more functions described herein.

The PSCell configuration processing circuitry 1342 may include functionality for a means for modifying a configuration. For example, the PSCell configuration processing circuitry 1342 may be configured to receive information (e.g., a measurement report) and determine whether to initiate a CPC or CPA procedure based on the received information (e.g., as discussed above in conjunction with FIGS. 7-12).

The PSCell configuration processing circuitry 1342 may include functionality for a means for generating an MCG configuration. For example, the PSCell configuration processing circuitry 1342 may be configured to receive information (e.g., at least one identifier, etc.) for at least one candidate target PSCell and generate the MCG configuration based on the received information (e.g., as discussed above in conjunction with FIGS. 7-12). The PSCell configuration processing circuitry 1342 may include functionality for a means for modifying an MCG configuration. For example, the PSCell configuration processing circuitry 1342 may be configured to receive information (e.g., an identifier, an indication of supported/unsupported radio bearers, an execution condition, etc.) for a candidate target PSCell (e.g., from an SN) and modify the MCG configuration based on the received information (e.g., as discussed above in conjunction with FIGS. 7-12). The PSCell configuration processing circuitry 1342 may include functionality for a means for including an MCG configuration and an SCG configuration in a CPA configuration. For example, the PSCell configuration processing circuitry 1342 may be configured to define a CPA configuration based on a modified MCG configuration and a received SCG configuration (e.g., as discussed above in conjunction with FIGS. 7-12). The PSCell configuration processing circuitry 1342 may include functionality for a means for removing from the MCG configuration the set of master node terminated radio bearers that the target PSCell cannot admit. For example, the PSCell configuration processing circuitry 1342 may be configured to receive an indication of at least one unsupported radio bearer for a candidate target PSCell (e.g., from an SN) and remove the at least one unsupported radio bearer from the MCG configuration (e.g., as discussed above in conjunction with FIGS. 7-12). The PSCell configuration processing circuitry 1342 may include functionality for a means for adding to the MCG configuration the set of secondary node terminated radio bearers that the target PSCell can admit. For example, the PSCell configuration processing circuitry 1342 may be configured to receive an indication of at least one supported radio bearer for a candidate target PSCell (e.g., from an SN) and add the at least one supported radio bearer to the MCG configuration (e.g., as discussed above in conjunction with FIGS. 7-12).

The PSCell configuration processing circuitry 1342 may include functionality for a means for identifying a radio bearer that a PSCell cannot admit. For example, the PSCell configuration processing circuitry 1342 may be configured to receive information (e.g., from an SN) that identifies radio bearers that a target SN cannot admit (e.g., as discussed above in conjunction with FIGS. 7-12).

The PSCell configuration processing circuitry 1342 may include functionality for a means for identifying a radio bearer that a PSCell can admit. For example, the PSCell configuration processing circuitry 1342 may be configured to receive information (e.g., from an SN) that identifies radio bearers that a target SN can admit (e.g., as discussed above in conjunction with FIGS. 7-12).

The processor 1304 may include PSCell configuration control circuitry 1343 configured to perform PSCell configuration control-related operations as discussed herein. The PSCell configuration control circuitry 1343 may be configured to execute PSCell configuration control software 1353 included on the computer-readable medium 1306 to implement one or more functions described herein.

The PSCell configuration control circuitry 1343 may include functionality for a means for outputting for transmission (and/or means for transmitting) a CPA configuration or a CPC configuration to a UE. For example, the PSCell configuration control circuitry 1343 may be configured to generate a CPA configuration or a CPC configuration including a modified MCG configuration and a received SCG configuration and transmit the CPA configuration or the CPC configuration via an allocated resource (e.g., via an RRC message on a PDSCH) to the UE (e.g., as discussed above in conjunction with FIGS. 7-12).

The PSCell configuration control circuitry 1343 may include functionality for a means for determining an execution condition. For example, the PSCell configuration control circuitry 1343 may be configured to select a CPC execution condition and/or a CPA execution condition based on an identifier of a target PSCell. As another example, the PSCell configuration control circuitry 1343 may be configured to receive a CPC execution condition and/or a CPA execution condition (e.g., from an SN) that indicates at least one condition for a UE to change PSCells and/or add a PSCell (e.g., as discussed above in conjunction with FIGS. 7-12). The PSCell configuration control circuitry 1343 may include functionality for a means for obtaining (and/or means for receiving) an execution condition. For example, the PSCell configuration control circuitry 1343 may be configured to receive a CPC execution condition and/or a CPA execution condition (e.g., from an SN) as discussed above in conjunction with FIGS. 7-12. The PSCell configuration control circuitry 1343 may include functionality for a means for generating a message that excludes an execution condition for a candidate target PSCell. For example, the PSCell configuration control circuitry 1343 may be configured to generate an SN addition request message that does not include an execution condition for a candidate target PSCell (e.g., as discussed above in conjunction with FIGS. 7-12). The PSCell configuration control circuitry 1343 may include functionality for a means for outputting for transmission (and/or means for transmitting) a message that excludes an execution condition for a target PSCell. For example, the PSCell configuration control circuitry 1343 may be configured to cooperate with (e.g., instruct) the communication and processing circuitry 1341 to transmit an SN addition request message that does not include an execution condition for a candidate target PSCell (e.g., as discussed above in conjunction with FIGS. 7-12). The PSCell configuration control circuitry 1343 may include functionality for a means for configuring a CPC execution condition. For example, the PSCell configuration control circuitry 1343 may be configured to define a CPC execution condition using an identifier of a target PSCell (e.g., as discussed above in conjunction with FIGS. 7-12).

The PSCell configuration control circuitry 1343 may include functionality for a means for generating a CPA configuration. For example, the PSCell configuration control circuitry 1343 may be configured to generate a CPA configuration based on an identifier of a target PSCell (e.g., as discussed above in conjunction with FIGS. 7-12). The PSCell configuration control circuitry 1343 may include functionality for a means for including a CPA execution condition in a CPA configuration. For example, the PSCell configuration control circuitry 1343 may be configured to generate a CPA configuration that includes the CPA execution condition or modify a CPA configuration to include the CPA execution condition (e.g., as discussed above in conjunction with FIGS. 7-12). The PSCell configuration control circuitry 1343 may include functionality for a means for including a CPC execution condition in a CPC configuration. For example, the PSCell configuration control circuitry 1343 may be configured to generate a CPC configuration that includes the CPC execution condition or modify a CPC configuration to include the CPC execution condition (e.g., as discussed above in conjunction with FIGS. 7-12).

Figure 14:
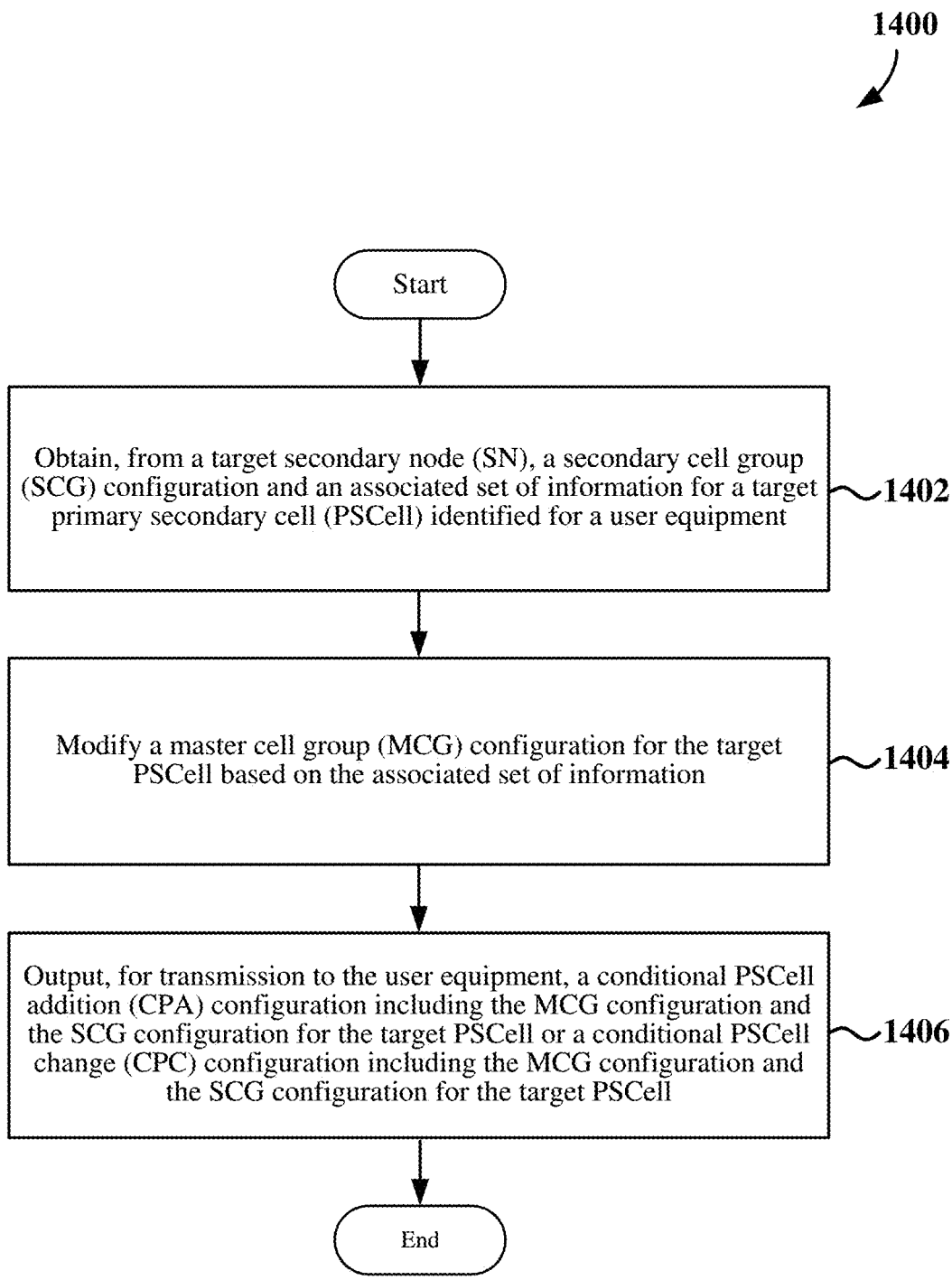
FIG. 14 is a flow chart illustrating an example method for modifying a configuration according to some aspects.

FIG. 14 is a flow chart illustrating an example method 1400 for wireless communication according to some aspects of the disclosure. As described herein, some or all illustrated features may be omitted in a particular implementation within the scope of the present disclosure, and some illustrated features may not be required for implementation of all examples. In some examples, the method 1400 may be carried out by the BS 1300 illustrated in FIG. 13. In some examples, the method 1400 may be carried out by any suitable apparatus or means for carrying out the functions or algorithm described below.

At block 1402, a base station (e.g., a master node) may obtain, from a target secondary node (SN), a secondary cell group (SCG) configuration and an associated set of information for a target primary secondary cell (PSCell) identified for a user equipment. For example, the PSCell configuration control circuitry 1343 together with the communication and processing circuitry 1341 and the transceiver 1310, shown and described above in connection with FIG. 13, may provide a means to obtain, from a target secondary node (SN), a secondary cell group (SCG) configuration and an associated set of information for a target primary secondary cell (PSCell) identified for a user equipment. In some examples, the base station is an MN of a multi radio access technology (multi-RAT)-dual connectivity (MR-DC) system for serving user equipment.

In some example, the target PSCell may initially be one of a set of candidate PSCells identified for the UE. This particular PSCell may subsequently be selected by the UE for a PSCell addition or change.

In some examples, the associated set of information may include an indication of whether a candidate target PSCell can support at least one radio bearer specified for a conditional PSCell addition or a conditional PSCell change. In some examples, the base station may receive an SN Addition Request Acknowledge message including the SCG configuration and the associated set of information. In some examples, the base station may receive an SN Modification Request Acknowledge message including the SCG configuration and the associated set of information. In some examples, the base station may receive an SN Modification Required message including the SCG configuration and the associated set of information.

At block 1404, the base station may modify a master cell group (MCG) configuration for the target PSCell based on the associated set of information. For example, the PSCell configuration control circuitry 1343, shown and described above in connection with FIG. 13, may provide a means to modify a master cell group (MCG) configuration for the target PSCell based on the associated set of information.

In some examples, the associated set of information specifies a set of master node terminated radio bearers that the target PSCell cannot admit. In some examples, the base station may remove from the MCG configuration the set of master node terminated radio bearers that the target PSCell cannot admit. In some examples, the base station may receive from the target SN an SN Addition Request Acknowledge message that includes the SCG configuration and the associated set of information.

In some examples, the associated set of information specifies a set of secondary node (SN) terminated radio bearers that the target PSCell can admit. In some examples, the base station may add to the MCG configuration the set of SN terminated radio bearers that the target PSCell can admit. In some examples, the base station may receive from the target SN a secondary node (SN) Modification Request Acknowledge message that includes the SCG configuration and the associated set of information.

At block 1406, the base station may output, for transmission to the user equipment, a conditional primary secondary cell (PSCell) addition (CPA) configuration including the MCG configuration and the SCG configuration for the target PSCell or a conditional PSCell change (CPC) configuration including the MCG configuration and the SCG configuration for the target PSCell. For example, the PSCell configuration control circuitry 1343 together with the communication and processing circuitry 1341 and the transceiver 1310, shown and described above in connection with FIG. 13, may provide a means to output, for transmission to the user equipment, a conditional PSCell addition (CPA) configuration including the MCG configuration and the SCG configuration for the target PSCell or a conditional PSCell change (CPC) configuration including the MCG configuration and the SCG configuration for the target PSCell.

In some examples, the base station may receive a secondary node (SN) Addition Request Acknowledge message that includes an identifier of the target PSCell, and generate the CPA configuration based on the identifier. In some examples, the SN Addition Request Acknowledge message includes at least one other identifier of at least one other target PSCell, and the base station may generate the CPA configuration based on the at least one other identifier. In some examples, the base station may receive a secondary node (SN) Addition Request Acknowledge message that includes at least one identifier of a candidate target PSCell, and generate the CPA configuration based on the at least one identifier.

In some examples, the base station may receive a secondary node (SN) Addition Request Acknowledge message that includes an identifier of the target PSCell, receive a CPA execution condition using the identifier of the target PSCell, and include the CPA execution condition in the CPA configuration. In some examples, the SN Addition Request Acknowledge message includes at least one other identifier of at least one other target PSCell, and the base station may receive at least one other CPA execution condition using the at least one other identifier of the at least one other target PSCell and include the at least one other CPA execution condition in the CPA configuration. In some examples, the base station may receive a secondary node (SN) Addition Request Acknowledge message that includes at least one identifier of a candidate target PSCell, and receive a CPA execution condition using the at least one identifier of the candidate target PSCell.

In some examples, the base station may receive a conditional PSCell change (CPC) execution condition for the target PSCell. In some examples, the base station may include the CPC execution condition in the CPC configuration. In some examples, the base station may receive a secondary node (SN) Addition Request Acknowledge message including the SCG configuration and the associated set of information for the target PSCell. In some examples, the base station may receive a secondary node (SN) Modification Request Acknowledge message including the SCG configuration and the associated set of information for the target PSCell. In some examples, the base station may receive a secondary node (SN) Modification Required message including the SCG configuration and the associated set of information for the target PSCell.

In some examples, the base station may generate a secondary node (SN) Addition Request message excluding an execution condition for a candidate target PSCell, and transmit the SN Addition Request message to the target SN. In some examples, the base station may receive an SN Addition Request Acknowledgement message including at least one identifier of a candidate target PSCell from the target SN after transmitting the SN Addition Request message, configure a CPC execution condition using the at least one identifier of the candidate target PSCell, and include the CPC execution condition in the CPC configuration. In some examples, the base station may receive a secondary node (SN) Addition Request Acknowledgement message including an identifier of the target PSCell from the target SN after transmitting the SN Addition Request message, configure a CPC execution condition using the identifier of the target PSCell, and include the CPC execution condition in the CPC configuration.

In some examples, the base station may receive, from the target secondary node, at least one other SCG configuration and at least one other associated set of information for at least one other target PSCell identified for the user equipment, and modify at least one other MCG configuration for the at least one other target PSCell based on the at least one other associated set of information. In addition, the base station may transmit, to the user equipment, at least one other CPA configuration including the at least one other MCG configuration and the at least one other SCG configuration for the at least one other target PSCell or at least one other CPC configuration including the at least one other MCG configuration and the at least one other SCG configuration for the at least one other target PSCell.

In some examples, the base station may receive at least one other CPA execution condition of the at least one other target PSCell or at least one other CPC execution condition of the at least one other target PSCell. In addition, the base station may include the at least one other CPA execution condition in the at least one other CPA configuration or include the at least one other CPC execution condition in the at least one other CPC configuration.

Figure 15:
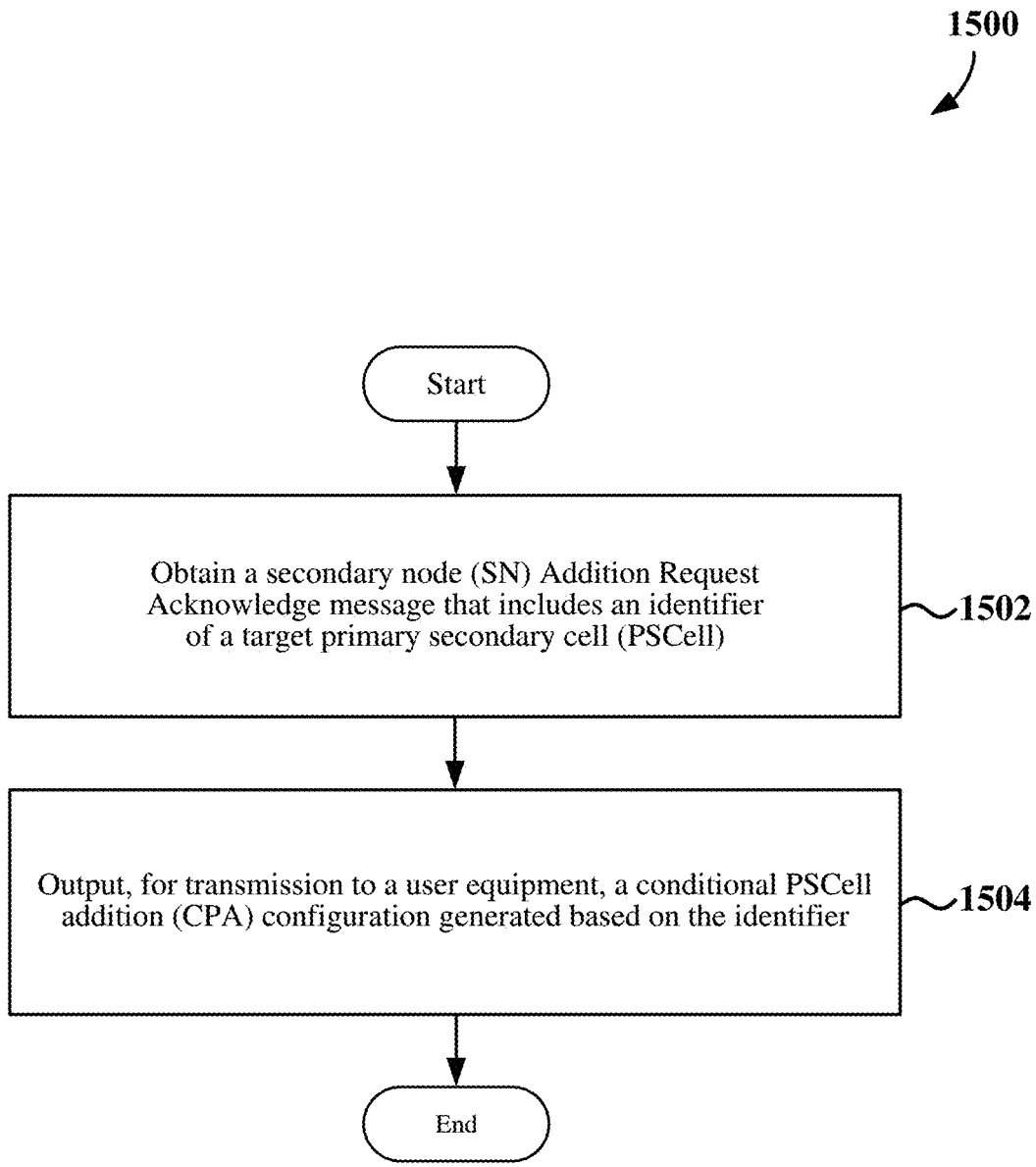
FIG. 15 is a flow chart illustrating an example method for providing a configuration according to some aspects.

FIG. 15 is a flow chart illustrating an example method 1500 for wireless communication according to some aspects of the disclosure. As described herein, some or all illustrated features may be omitted in a particular implementation within the scope of the present disclosure, and some illustrated features may not be required for implementation of all examples. In some examples, the method 1500 may be carried out by the BS 1300 illustrated in FIG. 13. In some examples, the method 1500 may be carried out by any suitable apparatus or means for carrying out the functions or algorithm described below.

At block 1502, a base station (e.g., a master node) may obtain a secondary node (SN) Addition Request Acknowledge message that includes an identifier of a target primary secondary cell (PSCell). For example, the PSCell configuration control circuitry 1343 together with the communication and processing circuitry 1341 and the transceiver 1310, shown and described above in connection with FIG. 13, may provide a means to obtain a secondary node (SN) Addition Request Acknowledge message that includes at least one identifier of a candidate target primary secondary cell (PSCell). In some examples, the BS is an MN of a multi radio access technology (multi-RAT)-dual connectivity (MR-DC) system for serving the user equipment.

At block 1504, the base station may output, for transmission to a user equipment, a conditional PSCell addition (CPA) configuration generated based on the identifier. For example, the PSCell configuration control circuitry 1343 together with the communication and processing circuitry 1341 and the transceiver 1310, shown and described above in connection with FIG. 13, may provide a means to output, for transmission to a user equipment, a conditional PSCell addition (CPA) configuration generated based on the identifier.

In some examples, the base station may determine a CPA execution condition using the identifier of the target PSCell, and include the CPA execution condition in the CPA configuration. In some examples, the base station may generate a secondary node (SN) Addition Request message including the at least one identifier, and transmit the SN Addition Request message to a target SN. In some examples, the SN Addition Request Acknowledge message includes at least one other identifier of at least one other target PSCell, and the base station may generate the CPA configuration based on the at least one other identifier.

In some examples, the base station may generate a secondary node (SN) Addition Request message excluding an execution condition for the target PSCell, and transmit the SN Addition Request message to a target SN. In some examples, the base station may receive an SN Addition Request Acknowledgement message including the identifier of the target PSCell from the target SN after transmitting the SN Addition Request message.

In some examples, the base station may receive a secondary cell group (SCG) configuration and an associated set of information from a target secondary node (SN), modify a master cell group (MCG) configuration based on the associated set of information, and include the MCG configuration and the SCG configuration in the CPA configuration. In some examples, the associated set of information specifies a set of master node terminated radio bearers that the target PSCell cannot admit. In some examples, the base station may remove from the MCG configuration the set of master node terminated radio bearers that the target PSCell cannot admit. In some examples, the associated set of information specifies a set of secondary node (SN) terminated radio bearers that the candidate target PSCell can admit. In some examples, the base station may add to the MCG configuration the set of SN terminated radio bearers that the candidate target PSCell can admit.

Figure 16:
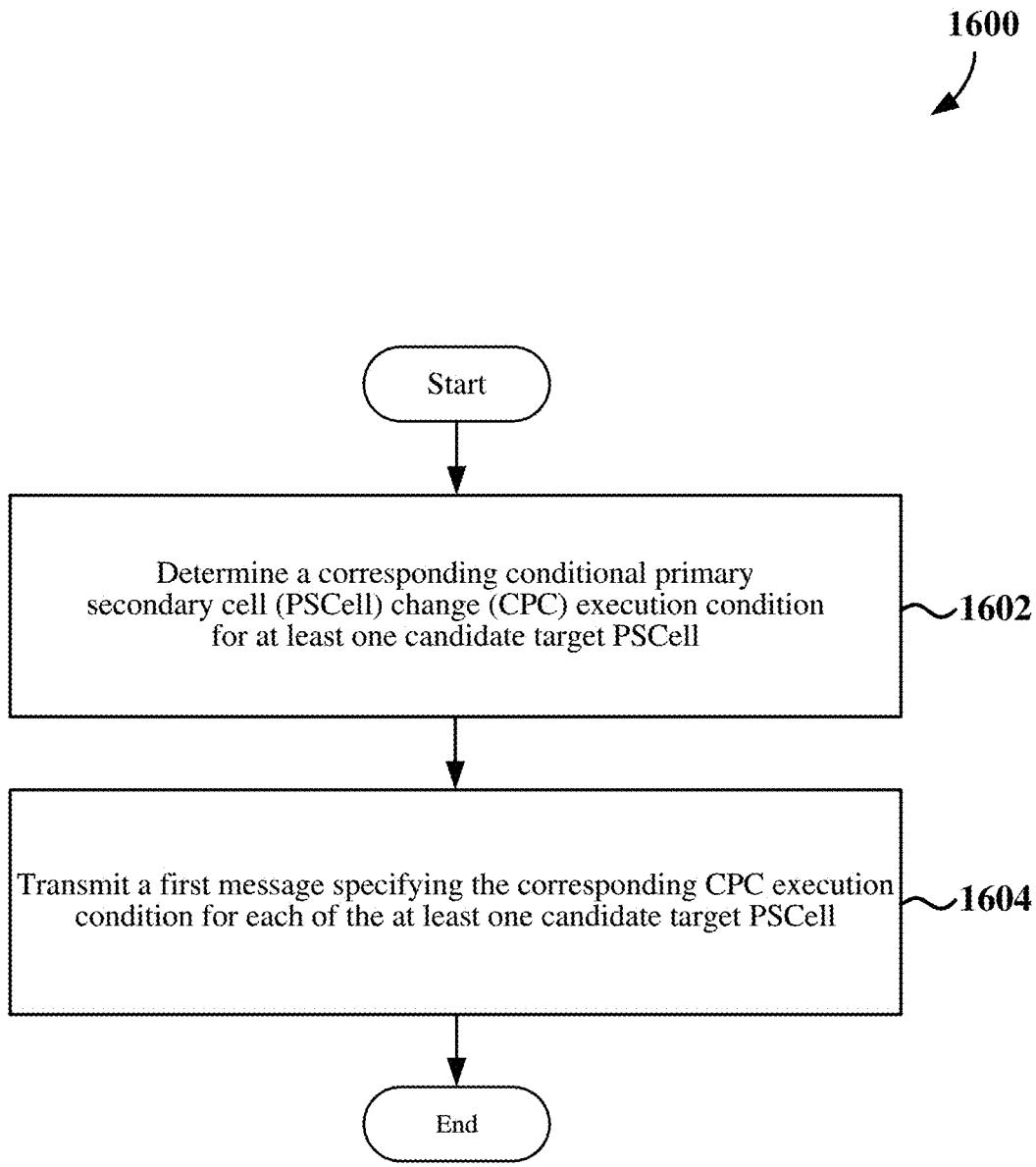
FIG. 16 is a flow chart illustrating an example method for providing an execution condition according to some aspects.

FIG. 16 is a flow chart illustrating an example method 1600 for wireless communication according to some aspects of the disclosure. As described herein, some or all illustrated features may be omitted in a particular implementation within the scope of the present disclosure, and some illustrated features may not be required for implementation of all examples. In some examples, the method 1600 may be carried out by the BS 1300 illustrated in FIG. 13. In some examples, the method 1600 may be carried out by any suitable apparatus or means for carrying out the functions or algorithm described below.

At block 1602, a base station (e.g., a source secondary node) may determine a corresponding conditional primary secondary cell (PSCell) change (CPC) execution condition for at least one candidate target PSCell. In some examples, the BS is an source SN of an MR-DC system for serving a user equipment. For example, the PSCell configuration control circuitry 1343 together with the communication and processing circuitry 1341 and the transceiver 1310, shown and described above in connection with FIG. 13, may provide a means to At block 1604, the base station may determine a corresponding CPC execution condition for each of the candidate target PSCells. For example, the PSCell configuration control circuitry 1343 together with the communication and processing circuitry 1341 and the transceiver 1310, shown and described above in connection with FIG. 13, may provide a means to In some examples, at least one target SN and associated candidate target PSCells are identified for a conditional PSCell change (CPC) procedure. In some examples, the at least one target SN and associated candidate target PSCells are identified for an SN initiated inter-SN conditional PSCell change (CPC) procedure. In some examples, the method may further include receiving a second message including setup information for a set of SN terminated radio bearers (RBs) for a CPC procedure for a candidate target PSCell.

In some examples, the method may further include identifying at least one SN terminated RB of the set of SN terminated RBs that the candidate target PSCell can support, and transmitting a third message including an indication of the at least one SN terminated RB.

Figure 17:
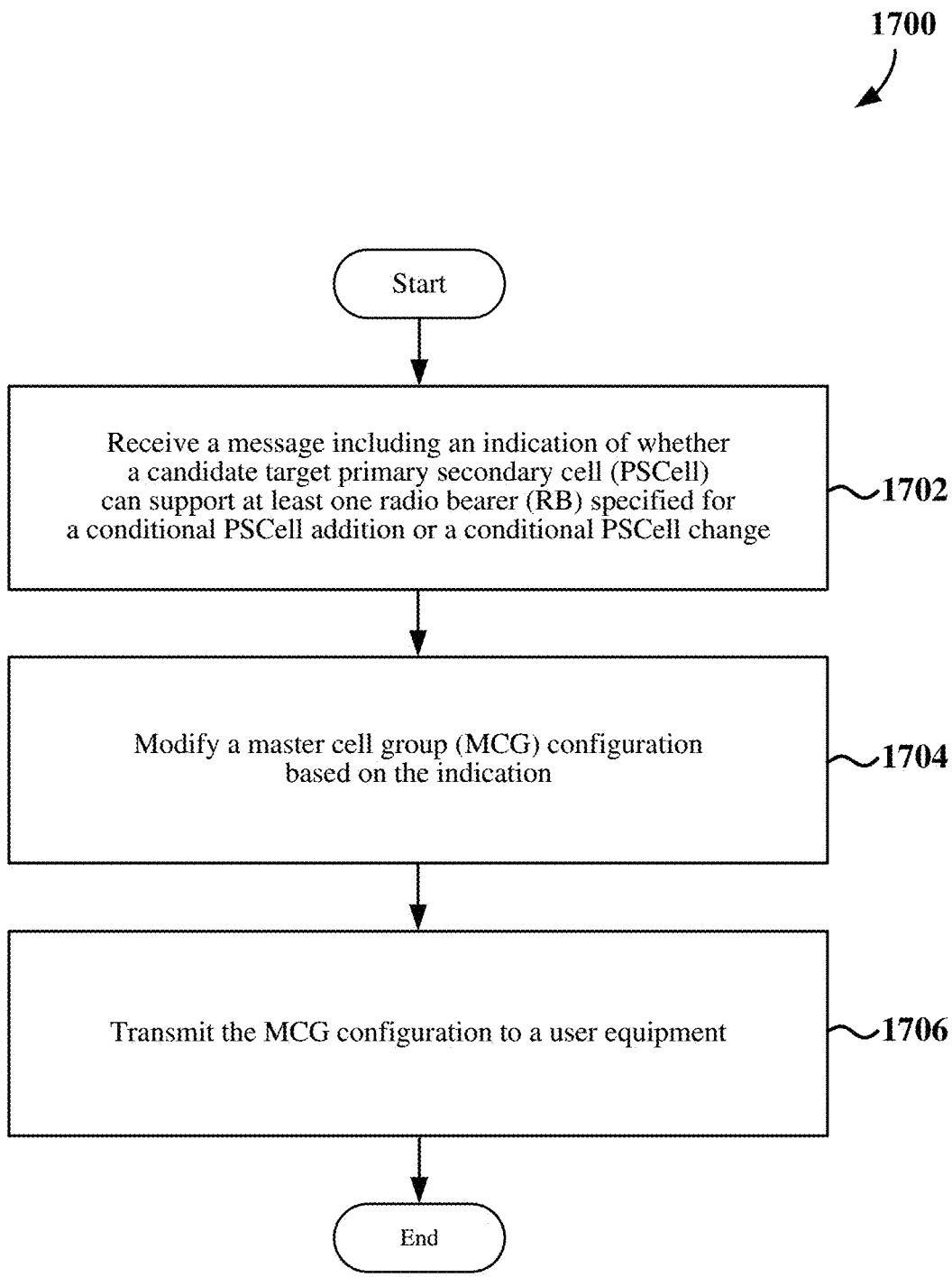
FIG. 17 is a flow chart illustrating an example method for modifying a cell group according to some aspects.

FIG. 17 is a flow chart illustrating an example method 1700 for wireless communication according to some aspects of the disclosure. As described herein, some or all illustrated features may be omitted in a particular implementation within the scope of the present disclosure, and some illustrated features may not be required for implementation of all examples. In some examples, the method 1700 may be carried out by the BS 1300 illustrated in FIG. 13. In some examples, the method 1700 may be carried out by any suitable apparatus or means for carrying out the functions or algorithm described below.

At block 1702, a base station (e.g., a master node) may receive a message including an indication of whether a candidate target primary secondary cell (PSCell) can support at least one radio bearer (RB) specified for a conditional PSCell addition or a conditional PSCell change. For example, the PSCell configuration control circuitry 1343 together with the communication and processing circuitry 1341 and the transceiver 1310, shown and described above in connection with FIG. 13, may provide a means to receive a message including an indication of whether a candidate target primary secondary cell (PSCell) can support at least one radio bearer (RB) specified for a conditional PSCell addition or a conditional PSCell change. In some examples, the BS is an MN of a multi radio access technology (multi-RAT)-dual connectivity (MR-DC) system for serving the user equipment.

At block 1704, the base station may modify a master cell group (MCG) configuration based on the indication. For example, the PSCell configuration control circuitry 1343, shown and described above in connection with FIG. 13, may provide a means to modify a master cell group (MCG) configuration based on the indication.

At block 1706, the base station may transmit the MCG configuration to a user equipment. For example, the PSCell configuration control circuitry 1343 together with the communication and processing circuitry 1341 and the transceiver 1310, shown and described above in connection with FIG. 13, may provide a means to transmit the MCG configuration to a user equipment.

In some examples, the indication specifies a set of MN terminated RBs that the candidate target PSCell cannot admit. In some examples, modifying the MCG configuration may include removing from the MCG configuration the set of MN terminated RBs that the candidate target PSCell cannot admit. In some examples, receiving the message may include receiving a secondary node (SN) Addition Request Acknowledge message from a target SN. In some examples, transmitting the MCG configuration may include transmitting a conditional PSCell addition (CPA) configuration that includes the MCG configuration, or transmitting a conditional PSCell change (CPC) configuration that includes the MCG configuration.

In some examples, the indication specifies a set of secondary node (SN) terminated RBs that the candidate target PSCell can use. For example, the indication may specify a set of secondary node (SN) terminated RBs that the candidate target PSCell can admit. In some examples, modifying the MCG configuration may include adding to the MCG configuration the set of MN terminated RBs that the candidate target PSCell can admit. In some examples, receiving the message may include receiving a secondary node (SN) Modification Request Acknowledge message from an SN. In some examples, transmitting the MCG configuration may include transmitting a conditional PSCell change (CPC) configuration that includes the MCG configuration.

In some examples, the method may further include receiving a secondary node (SN) Addition Request Acknowledge message that includes an identifier of the candidate target PSCell, determining (e.g., configuring) a conditional PSCell addition (CPA) execution condition using the identifier of the candidate target PSCell, and transmitting a CPA configuration including the CPA execution condition to the user equipment.

In some examples, the method may further include generating a secondary node (SN) Addition Request message including an execution condition for the candidate target PSCell, and transmitting the SN Addition Request message to a target SN.

In some examples, the method may further include receiving configuration information from a target secondary node (SN), wherein the configuration information may include at least one of: a secondary cell group (SCG) configuration for the candidate target PSCell, a conditional PSCell change (CPC) execution condition for the candidate target PSCell, or a combination thereof. In some examples, the method may further include generating a CPC configuration based on the configuration information, and transmitting the CPC configuration to the user equipment. In some examples, receiving the configuration information may include receiving an SN Addition Request Acknowledge message including the configuration information, or receiving an SN Modification Request Acknowledge message including the configuration information, or receiving an SN Modification Required message including the configuration information.

In some examples, the method may further include generating a secondary node (SN) Addition Request message excluding an execution condition for the candidate target PSCell, and transmitting the SN Addition Request message to a target SN. In some examples, the method may further include receiving an SN Addition Request Acknowledgement message including an identifier of the candidate target PSCell from the target SN after transmitting the SN Addition Request message, configuring a conditional PSCell addition (CPC) execution condition using the identifier of the candidate target PSCell, and transmitting a CPC configuration including the CPC execution condition to the user equipment.

In some examples, the method may further include generating a secondary node (SN) Modification Request message including setup information for SN-terminated split bearers for the candidate target PSCell, and transmitting the SN Modification Request message to an SN.

Figure 18:
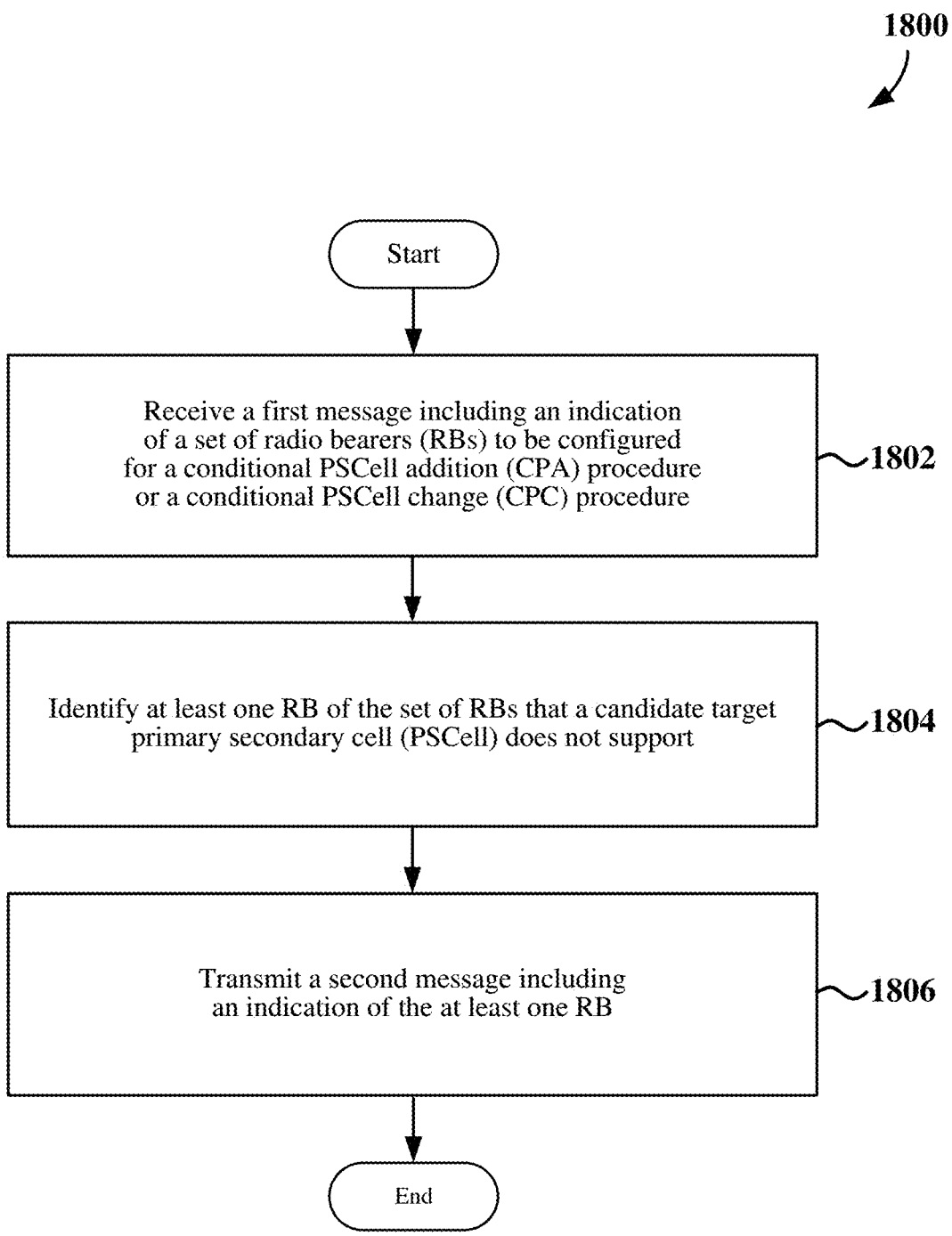
FIG. 18 is a flow chart illustrating an example method for configuring a primary secondary cell according to some aspects.

FIG. 18 is a flow chart illustrating an example method 1800 for wireless communication according to some aspects of the disclosure. As described herein, some or all illustrated features may be omitted in a particular implementation within the scope of the present disclosure, and some illustrated features may not be required for implementation of all examples. In some examples, the method 1800 may be carried out by the BS 1300 illustrated in FIG. 13. In some examples, the method 1800 may be carried out by any suitable apparatus or means for carrying out the functions or algorithm described below.

At block 1802, a base station (e.g., a target secondary node) may receive a first message including an indication of a set of radio bearers (RBs) to be configured for a conditional PSCell addition (CPA) procedure or a conditional PSCell change (CPC) procedure. For example, the PSCell configuration control circuitry 1343 together with the communication and processing circuitry 1341 and the transceiver 1310, shown and described above in connection with FIG. 13, may provide a means to receive a first message including an indication of a set of radio bearers (RBs) to be configured for a conditional PSCell addition (CPA) procedure or a conditional PSCell change (CPC) procedure. In some examples, the BS is an target SN of an MR-DC system for serving a user equipment.

At block 1804, the base station may identify at least one RB of the set of RBs that a candidate target primary secondary cell (PSCell) does not support. For example, the PSCell configuration control circuitry 1343, shown and described above in connection with FIG. 13, may provide a means to identify at least one RB of the set of RBs that a candidate target primary secondary cell (PSCell) does not support.

At block 1806, the base station may transmit a second message including an indication of the at least one RB. For example, the PSCell configuration control circuitry 1343 together with the communication and processing circuitry 1341 and the transceiver 1310, shown and described above in connection with FIG. 13, may provide a means to transmit a second message including an indication of the at least one RB.

In some examples, the set of RBs may include a set of master node (MN) terminated RBs. In some examples, the set of RBs may include a set of secondary node (SN) terminated RBs.

In some examples, the first message is a secondary node (SN) Addition Request message. In some examples, the second message is secondary node (SN) Addition Request Acknowledge message.

In some examples, the first message further may include an indication of a plurality of candidate target PSCells. In some examples, the second message further may include identifiers of a plurality of candidate target PSCells.

In some examples, the second message further may include an indication of a plurality of candidate target PSCells, and a corresponding CPC execution condition for each of the plurality of candidate target PSCells.

In some examples, the first message does not indicate a CPC execution condition for a candidate target PSCell, and the second message includes an identifier of the candidate target PSCell. In some examples, the identifier of the candidate target PSCell is sent at a top level of an information element (IE) structure that is visible to a master node (MN).

Figure 19:
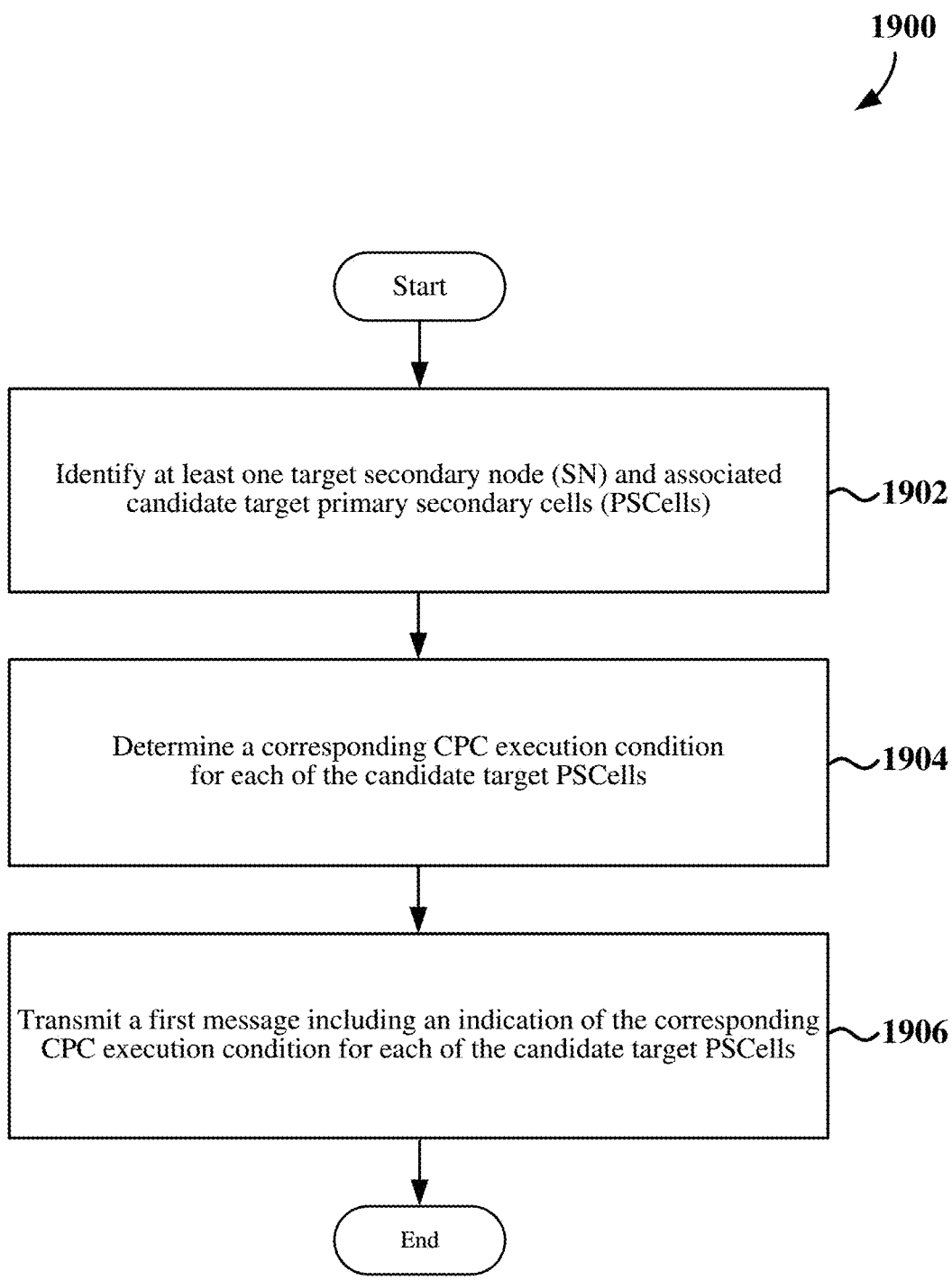
FIG. 19 is a flow chart illustrating another example method for configuring a primary secondary cell according to some aspects.

FIG. 19 is a flow chart illustrating an example method 1900 for wireless communication according to some aspects of the disclosure. As described herein, some or all illustrated features may be omitted in a particular implementation within the scope of the present disclosure, and some illustrated features may not be required for implementation of all examples. In some examples, the method 1900 may be carried out by the BS 1300 illustrated in FIG. 13. In some examples, the method 1900 may be carried out by any suitable apparatus or means for carrying out the functions or algorithm described below.

At block 1902, a base station (e.g., a source secondary node) may identify at least one target secondary node (SN) and associated candidate target primary secondary cells (PSCells). For example, the PSCell configuration control circuitry 1343 together with the communication and processing circuitry 1341 and the transceiver 1310, shown and described above in connection with FIG. 13, may provide a means to identify at least one target secondary node (SN) and associated candidate target primary secondary cells (PSCells). In some examples, the BS is an source SN of an MR-DC system for serving a user equipment.

At block 1904, the base station may determine a corresponding CPC execution condition for each of the candidate target PSCells. For example, the PSCell configuration control circuitry 1343 together with the communication and processing circuitry 1341 and the transceiver 1310, shown and described above in connection with FIG. 13, may provide a means to determine a corresponding CPC execution condition for each of the candidate target PSCells.

At block 1906, the base station may transmit a first message specifying the corresponding CPC execution condition for each of the candidate target PSCells. For example, the PSCell configuration control circuitry 1343 together with the communication and processing circuitry 1341 and the transceiver 1310, shown and described above in connection with FIG. 13, may provide a means to transmit a first message specifying the corresponding CPC execution condition for each of the candidate target PSCells.

In some examples, the first message may be an SN Change Required message. In some examples, the first message may be an SN Modification Required message. In some examples, the second message may be an SN Modification Request message.

In some examples, the at least one target SN and associated candidate target PSCells are identified for a conditional PSCell change (CPC) procedure.

In some examples, the at least one target SN and associated candidate target PSCells are identified for an SN initiated inter-SN conditional PSCell change (CPC) procedure. In some examples, the method may further include receiving a second message including setup information for a set of SN terminated radio bearers (RBs) for a CPC procedure for a candidate target PSCell.

In some examples, the method may further include identifying at least one SN terminated RB of the set of SN terminated RBs that the candidate target PSCell can support, and transmitting a third message including an indication of the at least one SN terminated RB.

In some examples, a method for wireless communication at a master node (MN) may include receiving a message including an indication of whether a candidate target primary secondary cell (PSCell) can support at least one radio bearer (RB) specified for a conditional PSCell addition or a conditional PSCell change, modifying a master cell group (MCG) configuration based on the indication. and transmitting the MCG configuration to a user equipment.

In some examples, a master node (MN) may include a transceiver, a memory, and a processor communicatively coupled to the transceiver and the memory. The processor and the memory may be configured to receive via the transceiver a message including an indication of whether a candidate target primary secondary cell (PSCell) can support at least one radio bearer (RB) specified for a conditional PSCell addition or a conditional PSCell change, modify a master cell group (MCG) configuration based on the indication, and transmit the MCG configuration via the transceiver to a user equipment.

In some examples, a master node (MN) may include means for receiving a message including an indication of whether a candidate target primary secondary cell (PSCell) can support at least one radio bearer (RB) specified for a conditional PSCell addition or a conditional PSCell change, means for modifying a master cell group (MCG) configuration based on the indication, and means for transmitting the MCG configuration to a user equipment.

In some examples, an article of manufacture for use by a master node (MN) includes a computer-readable medium having stored therein instructions executable by one or more processors of the MN to receive a message including an indication of whether a candidate target primary secondary cell (PSCell) can support at least one radio bearer (RB) specified for a conditional PSCell addition or a conditional PSCell change, modify a master cell group (MCG) configuration based on the indication, and transmit the MCG configuration to a user equipment.

In some examples, a method for wireless communication at a target secondary node may include receiving a first message including an indication of a set of radio bearers (RBs) to be configured for a conditional PSCell addition (CPA) procedure or a conditional PSCell change (CPC) procedure, identifying at least one RB of the set of RBs that a candidate target primary secondary cell (PSCell) does not support, and transmitting a second message including an indication of the at least one RB.

In some examples, a target secondary node may include a transceiver, a memory, and a processor communicatively coupled to the transceiver and the memory. The processor and the memory may be configured to receive via the transceiver a first message including an indication of a set of radio bearers (RBs) to be configured for a conditional PSCell addition (CPA) procedure or a conditional PSCell change (CPC) procedure, identify at least one RB of the set of RBs that a candidate target primary secondary cell (PSCell) does not support, and transmit via the transceiver a second message including an indication of the at least one RB.

In some examples, a target secondary node may include means for receiving a first message including an indication of a set of radio bearers (RBs) to be configured for a conditional PSCell addition (CPA) procedure or a conditional PSCell change (CPC) procedure, means for identifying at least one RB of the set of RBs that a candidate target primary secondary cell (PSCell) does not support, and means for transmitting a second message including an indication of the at least one RB.

In some examples, an article of manufacture for use by a target secondary node includes a computer-readable medium having stored therein instructions executable by one or more processors of the target secondary node to receive a first message including an indication of a set of radio bearers (RBs) to be configured for a conditional PSCell addition (CPA) procedure or a conditional PSCell change (CPC) procedure, identify at least one RB of the set of RBs that a candidate target primary secondary cell (PSCell) does not support, and transmit a second message including an indication of the at least one RB.

In some examples, a method for wireless communication at a source secondary node may include identifying at least one target secondary node (SN) and associated candidate target primary secondary cells (PSCells), determining a corresponding conditional PSCell change (CPC) execution condition for each of the candidate target PSCells, and transmitting a first message specifying the corresponding CPC execution condition for each of the candidate target PSCells.

In some examples, a source secondary node may include a transceiver, a memory, and a processor communicatively coupled to the transceiver and the memory. The processor and the memory may be configured to identify at least one target secondary node (SN) and associated candidate target primary secondary cells (PSCells), determine a corresponding conditional PSCell change (CPC) execution condition for each of the candidate target PSCells, and transmit via the transceiver a first message specifying the corresponding CPC execution condition for each of the candidate target PSCells.

In some examples, a source secondary node may include means for identifying at least one target secondary node (SN) and associated candidate target primary secondary cells (PSCells), means for determining a corresponding conditional PSCell change (CPC) execution condition for each of the candidate target PSCells, and means for transmitting a first message specifying the corresponding CPC execution condition for each of the candidate target PSCells.

In some examples, an article of manufacture for use by a source secondary node includes a computer-readable medium having stored therein instructions executable by one or more processors of the target secondary node to identify at least one target secondary node (SN) and associated candidate target primary secondary cells (PSCells), determine a corresponding conditional PSCell change (CPC) execution condition for each of the candidate target PSCells, and transmit a first message specifying the corresponding CPC execution condition for each of the candidate target PSCells.

In one configuration, the base station 1300 includes means for receiving, from a target secondary node (SN), a secondary cell group (SCG) configuration and an associated set of information for a target primary secondary cell (PSCell) identified for a user equipment, means for modifying a master cell group (MCG) configuration for the target PSCell based on the associated set of information, and means for transmitting, to the user equipment, a conditional PSCell addition (CPA) configuration including the MCG configuration and the SCG configuration for the target PSCell or a conditional PSCell change (CPC) configuration including the MCG configuration and the SCG configuration for the target PSCell. In one configuration, the base station 1300 includes means for receiving a secondary node (SN) Addition Request Acknowledge message that includes an identifier of a target primary secondary cell (PSCell), and means for transmitting, to a user equipment, a conditional PSCell addition (CPA) configuration generated based on the identifier. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, and 4-13 and utilizing, for example, the methods and/or algorithms described herein in relation to FIGS. 14-19.

The methods shown in FIGS. 14-19 may include additional aspects, such as any single aspect or any combination of aspects described below and/or in connection with one or more other processes described elsewhere herein. The following provides an overview of several aspects of the present disclosure. In some examples, an apparatus that performs one or more of the aspects described herein may be a chipset (e.g., at least one integrated circuit). In some examples, an apparatus that performs one or more of the aspects described herein may be a master node (e.g., that includes a chipset and a transceiver).

Aspect 1: A method for wireless communication at an apparatus, e.g., a master node, the method comprising: obtaining, from a target secondary node (SN), a secondary cell group (SCG) configuration and an associated set of information for a target primary secondary cell (PSCell) identified for a user equipment; modifying a master cell group (MCG) configuration for the target PSCell based on the associated set of information; and outputting, for transmission to the user equipment, a conditional PSCell addition (CPA) configuration comprising the MCG configuration and the SCG configuration for the target PSCell or a conditional PSCell change (CPC) configuration comprising the MCG configuration and the SCG configuration for the target PSCell.

Aspect 2: The method of aspect 1, wherein the associated set of information specifies a set of master node terminated radio bearers that the target PSCell cannot admit.

Aspect 3: The method of aspect 2, wherein the modifying the MCG configuration comprises removing from the MCG configuration the set of master node terminated radio bearers that the target PSCell cannot admit.

Aspect 4: The method of aspect 1, wherein the associated set of information specifies a set of secondary node (SN) terminated radio bearers that the target PSCell can admit.

Aspect 5: The method of aspect 4, wherein the modifying the MCG configuration comprises adding to the MCG configuration the set of SN terminated radio bearers that the target PSCell can admit.

Aspect 6: The method of any of aspects 1 through 5, further comprising: obtaining a secondary node (SN) Addition Request Acknowledge message that includes an identifier of the target PSCell; and generating the CPA configuration based on the identifier.

Aspect 7: The method of aspect 6, wherein: the SN Addition Request Acknowledge message includes at least one other identifier of at least one other target PSCell; and the method further comprises generating the CPA configuration based on the at least one other identifier.

Aspect 8: The method of any of aspects 1 through 7, further comprising: obtaining a secondary node (SN) Addition Request Acknowledge message that includes an identifier of the target PSCell; obtaining a CPA execution condition using the identifier of the target PSCell; and including the CPA execution condition in the CPA configuration.

Aspect 9: The method of aspect 8, wherein: the SN Addition Request Acknowledge message includes at least one other identifier of at least one other target PSCell; the method further comprises obtaining at least one other CPA execution condition using the at least one other identifier of the at least one other target PSCell; and the method further comprises including the at least one other CPA execution condition in the CPA configuration.

Aspect 10: The method of any of aspects 1 through 9, further comprising: obtaining a conditional PSCell change (CPC) execution condition for the target PSCell.

Aspect 11: The method of aspect 10, further comprising: including the CPC execution condition in the CPC configuration.

Aspect 12: The method of any of aspects 1 through 11, further comprising: obtaining a secondary node (SN) Addition Request Acknowledge message comprising the SCG configuration and the associated set of information for the target PSCell.

Aspect 13: The method of any of aspects 1 through 11, further comprising: obtaining a secondary node (SN) Modification Request Acknowledge message comprising the SCG configuration and the associated set of information for the target PSCell.

Aspect 14: The method of any of aspects 1 through 11, further comprising: obtaining a secondary node (SN) Modification Required message comprising the SCG configuration and the associated set of information for the target PSCell.

Aspect 15: The method of any of aspects 1 through 14, further comprising: generating a secondary node (SN) Addition Request message excluding an execution condition for a candidate target PSCell; and outputting, for transmission, the SN Addition Request message to the target SN.

Aspect 16: The method of aspect 15, further comprising: obtaining a secondary node (SN) Addition Request Acknowledgement message comprising an identifier of the target PSCell from the target SN after outputting the SN Addition Request message; configuring a CPC execution condition using the identifier of the target PSCell; and including the CPC execution condition in the CPC configuration.

Aspect 17: The method of any of aspects 1 through 16, wherein the associated set of information comprises an indication of whether a candidate target PSCell can support at least one radio bearer specified for a conditional PSCell addition or a conditional PSCell change.

Aspect 18: The method of any of aspects 1 through 17, further comprising: obtaining, from the target secondary node, at least one other SCG configuration and at least one other associated set of information for at least one other target PSCell identified for the user equipment; modifying at least one other MCG configuration for the at least one other target PSCell based on the at least one other associated set of information; and outputting, for transmission to the user equipment, at least one other CPA configuration comprising the at least one other MCG configuration and the at least one other SCG configuration for the at least one other target PSCell or at least one other CPC configuration comprising the at least one other MCG configuration and the at least one other SCG configuration for the at least one other target PSCell.

Aspect 19: The method of any of aspects 1 through 18, further comprising: obtaining at least one other CPA execution condition of the at least one other target PSCell or at least one other CPC execution condition of the at least one other target PSCell; and including the at least one other CPA execution condition in the at least one other CPA configuration or include the at least one other CPC execution condition in the at least one other CPC configuration.

Aspect 20: The method of any of aspects 1 through 19, wherein the master node is part of a multi radio access technology (multi-RAT)-dual connectivity (MR-DC) system for serving the user equipment.

Aspect 21: The method of any of aspects 1 through 20, further comprising: receiving, from the target SN, the SCG configuration and the associated set of information for the target PSCell; and transmitting, to the user equipment, the CPA configuration including the MCG configuration and the SCG configuration for the target PSCell or the CPC configuration including the MCG configuration and the SCG configuration for the target PSCell.

Aspect 22: A method for wireless communication at an apparatus, e.g., a master node, the method comprising: obtaining a secondary node (SN) Addition Request Acknowledge message that includes an identifier of a target primary secondary cell (PSCell); and outputting, for transmission to a user equipment, a conditional PSCell addition (CPA) configuration generated based on the identifier.

Aspect 23: The method of aspect 22, further comprising: determining a CPA execution condition using the identifier of the target PSCell; and including the CPA execution condition in the CPA configuration.

Aspect 24: The method of any of aspects 22 through 23, wherein: the SN Addition Request Acknowledge message includes at least one other identifier of at least one other target PSCell; and the process further comprises generating the CPA configuration based on the at least one other identifier.

Aspect 25: The method of any of aspects 22 through 24, further comprising: generating a secondary node (SN) Addition Request message excluding an execution condition for the target PSCell; and outputting the SN Addition Request message for transmission to a target SN.

Aspect 26: The method of aspect 25, further comprising: obtaining the SN Addition Request Acknowledgement message from the target SN after outputting the SN Addition Request message.

Aspect 27: The method of any of aspects 22 through 26, further comprising: obtaining a secondary cell group (SCG) configuration and an associated set of information from a target secondary node (SN); modifying a master cell group (MCG) configuration based on the associated set of information; and including the MCG configuration and the SCG configuration in the CPA configuration.

Aspect 28: The method of aspect 27, wherein: the associated set of information specifies a set of master node terminated radio bearers that the target PSCell cannot admit; and the modifying the MCG configuration comprises removing from the MCG configuration the set of master node terminated radio bearers that the target PSCell cannot admit.

Aspect 29: The method of aspect 27, wherein: the associated set of information specifies a set of secondary node (SN) terminated radio bearers that the target PSCell can admit; and the modifying the MCG configuration comprises adding to the MCG configuration the set of SN terminated radio bearers that the target PSCell can admit.

Aspect 30: The method of any of aspects 22 through 29, further comprising: receiving the SN Addition Request Acknowledge message; and transmitting the CPA configuration to the user equipment.

Aspect 31: An apparatus configured for wireless communication comprising an interface and a processing system coupled to the interface, wherein the processing system is configured to perform any one of aspects 1 through 21.

Aspect 32: An apparatus configured for wireless communication comprising at least one means for performing any one of aspects 1 through 21.

Aspect 33: A non-transitory computer-readable medium storing computer-executable code, comprising code for causing an apparatus to perform any one of aspects 1 through 21.

Aspect 34: An apparatus configured for wireless communication comprising an interface and a processing system coupled to the interface, wherein the processing system is configured to perform any one of aspects 22 through 30.

Aspect 35: An apparatus configured for wireless communication comprising at least one means for performing any one of aspects 22 through 30.

Aspect 36: A non-transitory computer-readable medium storing computer-executable code, comprising code for causing an apparatus to perform any one of aspects 22 through 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, and 4-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
an interface; and
a processing system configured to:
   obtain, via the interface, a secondary node (SN) Addition Request Acknowledge message comprising a secondary cell group (SCG) configuration and an associated set of information for a target cell associated with a user equipment;
   modify a master cell group (MCG) configuration for the target cell based on the associated set of information; and
   output, via the interface, for transmission to the user equipment, a conditional cell addition configuration comprising the modified MCG configuration and the SCG configuration for the target cell or a conditional cell change configuration comprising the modified MCG configuration and the SCG configuration for the target cell.

2. The apparatus of claim 1, wherein the associated set of information specifies a set of master node terminated radio bearers that the target cell cannot admit.

3. The apparatus of claim 2, wherein, to modify the MCG configuration, the processing system is further configured to:
   remove from the MCG configuration the set of master node terminated radio bearers that the target cell cannot admit.

4. The apparatus of claim 1, wherein the associated set of information specifies a set of secondary node (SN) terminated radio bearers that the target cell can admit.

5. The apparatus of claim 4, wherein, to modify the MCG configuration, the processing system is further configured to:
   add to the MCG configuration the set of SN terminated radio bearers that the target cell can admit.

6. The apparatus of claim 1, wherein:
the SN Addition Request Acknowledge message includes an identifier of the target cell; and
the processing system is further configured to generate the conditional cell addition configuration based on the identifier.

7. The apparatus of claim 6, wherein:
the SN Addition Request Acknowledge message includes at least one other identifier of at least one other target cell; and
the processing system is further configured to generate the conditional cell addition configuration based on the at least one other identifier.

8. The apparatus of claim 1, wherein:
the SN Addition Request Acknowledge message includes an identifier of the target cell;
the processing system is further configured to obtain, via the interface, a conditional cell addition execution condition using the identifier of the target cell; and
the processing system is further configured to include the conditional cell addition execution condition in the conditional cell addition configuration.

9. The apparatus of claim 8, wherein:
the SN Addition Request Acknowledge message includes at least one other identifier of at least one other target cell;
the processing system is further configured to obtain, via the interface, at least one other conditional cell addition execution condition using the at least one other identifier of the at least one other target cell; and
the processing system is further configured to include the at least one other conditional cell addition execution condition in the conditional cell addition configuration.

10. The apparatus of claim 1, wherein the processing system is further configured to:
obtain, via the interface, a conditional cell change execution condition for the target cell.

11. The apparatus of claim 10, wherein the processing system is further configured to:
generate the conditional cell change configuration including the conditional cell change execution condition.

12. The apparatus of claim 1, wherein, to obtain the SCG configuration and the associated set of information for the target cell, the processing system is further configured to:
obtain, via the interface, a secondary node (SN) Modification Request Acknowledge message comprising the SCG configuration and the associated set of information for the target cell.

13. The apparatus of claim 1, wherein, to obtain the SCG configuration and the associated set of information for the target cell, the processing system is further configured to:
obtain, via the interface, a secondary node (SN) Modification Required message comprising the SCG configuration and the associated set of information for the target cell.

14. The apparatus of claim 1, wherein the processing system is further configured to:
generate a secondary node (SN) Addition Request message excluding an execution condition for a candidate target cell; and
output, via the interface, for transmission, the SN Addition Request message to a target SN.

15. The apparatus of claim 14, wherein the processing system is further configured to:
obtain, via the interface, the SN Addition Request Acknowledgement message comprising an identifier of the target cell from the target SN after outputting the SN Addition Request message;
configure a conditional cell change execution condition using the identifier of the target cell; and
generate the conditional cell change configuration including the conditional cell change execution condition.

16. The apparatus of claim 1, wherein the associated set of information comprises an indication of whether a candidate target cell can support at least one radio bearer specified for a conditional cell addition or a conditional cell change.

17. The apparatus of claim 1, wherein the processing system is further configured to:
obtain, via the interface, at least one other SCG configuration and at least one other associated set of information for at least one other target cell associated with the user equipment;
modify at least one other MCG configuration for the at least one other target cell based on the at least one other associated set of information; and
output, via the interface, for transmission to the user equipment, at least one other conditional cell addition configuration comprising the modified at least one other MCG configuration and the at least one other SCG configuration for the at least one other target cell or at least one other conditional cell change configuration comprising the modified at least one other MCG configuration and the at least one other SCG configuration for the at least one other target cell.

18. The apparatus of claim 17, wherein the processing system is further configured to:
obtain, via the interface, at least one other conditional cell addition execution condition of the at least one other target cell or at least one other conditional cell change execution condition of the at least one other target cell; and
include the at least one other conditional cell addition execution condition in the at least one other conditional cell addition configuration or include the at least one other conditional cell change execution condition in the at least one other conditional cell change configuration.

19. The apparatus of claim 1, further comprising a transceiver configured to:
receive the SCG configuration and the associated set of information for the target cell; and
transmit, to the user equipment, the conditional cell addition configuration including the modified MCG configuration and the SCG configuration for the target cell or the conditional cell change configuration including the modified MCG configuration and the SCG configuration for the target cell, wherein the apparatus is configured as a network entity.

20. A method for wireless communication at a network entity, the method comprising:
obtaining a secondary node (SN) Addition Request Acknowledge message comprising a secondary cell group (SCG) configuration and an associated set of information for a target cell associated with a user equipment;
modifying a master cell group (MCG) configuration for the target cell based on the associated set of information; and
outputting, for transmission to the user equipment, a conditional cell addition configuration comprising the modified MCG configuration and the SCG configuration for the target cell or a conditional cell change configuration comprising the modified MCG configuration and the SCG configuration for the target cell.

21. An apparatus for wireless communication, comprising:
an interface; and
a processing system configured to:
obtain, via the interface, a secondary node (SN) Addition Request Acknowledge message that includes an identifier of a target cell;
obtain, via the interface, a secondary cell group (SCG) configuration and an associated set of information from a target secondary node (SN) wherein the associated set of information specifies a set of master node terminated radio bearers that the target cell cannot admit;

modify a master cell group (MCG) configuration based on the associated set of information, the modification of the MCG configuration comprising removal of, from the MCG configuration, the set of master node terminated radio bearers that the target cell cannot admit;

generate a conditional cell addition configuration based on the identifier, the conditional cell addition configuration including the modified MCG configuration and the SCG configuration; and output the conditional cell addition configuration, via the interface, for transmission.

22. The apparatus of claim 21, wherein the processing system is further configured to:

generate the conditional cell addition configuration including a conditional cell addition execution condition associated with the identifier of the target cell.

23. The apparatus of claim 21, wherein:

the SN Addition Request Acknowledge message includes at least one other identifier of at least one other target cell; and the processing system is further configured to generate the conditional cell addition configuration based on the at least one other identifier.

24. The apparatus of claim 21, wherein the processing system is further configured to:

generate a secondary node (SN) Addition Request message excluding an execution condition for the target cell; and output, via the interface, the SN Addition Request message for transmission to a target SN.

25. The apparatus of claim 24, wherein the processing system is further configured to:

obtain, via the interface, the SN Addition Request Acknowledgement message from the target SN after outputting the SN Addition Request message.

26. The apparatus of claim 21, wherein:

the associated set of information specifies a set of secondary node (SN) terminated radio bearers that the target cell can admit; and to modify the MCG configuration, the processing system is further configured to add to the MCG configuration the set of SN terminated radio bearers that the target cell can admit.

27. The apparatus of claim 21, further comprising a transceiver configured to:

receive the SN Addition Request Acknowledge message; and transmit the conditional cell addition configuration, wherein the apparatus is configured as a network entity.

28. The apparatus of claim 1, wherein at least one of:

the target cell comprises a target primary secondary cell (PSCell);

the conditional cell addition configuration comprises a conditional PSCell addition (CPA) configuration; or the conditional cell change configuration comprises a conditional PSCell change (CPC) configuration.

* * * * *